United States Patent
Kakuya et al.

(10) Patent No.: US 8,050,846 B2
(45) Date of Patent: Nov. 1, 2011

(54) APPARATUS AND METHOD FOR CONTROLLING ENGINE

(75) Inventors: Hiromu Kakuya, Hitachinaka (JP); Kengo Kumano, Hitachinaka (JP); Shiro Yamaoka, Hitachi (JP)

(73) Assignee: Hitachi, Ltd., Tokyo (JP)

(*) Notice: Subject to any disclaimer, the term of this patent is extended or adjusted under 35 U.S.C. 154(b) by 378 days.

(21) Appl. No.: 12/470,981

(22) Filed: May 22, 2009

(65) Prior Publication Data

US 2009/0312936 A1  Dec. 17, 2009

(30) Foreign Application Priority Data

Jun. 13, 2008 (JP) ................ 2008-155737

(51) Int. Cl.
*F02D 13/02* (2006.01)
*F02B 17/00* (2006.01)

(52) U.S. Cl. ..................... 701/103; 123/295

(58) Field of Classification Search .......... 701/102, 701/103, 111, 110; 123/295, 305, 399, 435
See application file for complete search history.

(56) References Cited

U.S. PATENT DOCUMENTS

| | | | |
|---|---|---|---|
| 7,540,270 B2* | 6/2009 | Kang et al. | 123/295 |
| 7,689,344 B2* | 3/2010 | Kang et al. | 701/103 |
| 7,822,529 B2* | 10/2010 | Dagci et al. | 701/102 |

FOREIGN PATENT DOCUMENTS

| | | | |
|---|---|---|---|
| JP | 2003-148180 A | 5/2003 | |
| JP | 2009-243295 A | 10/2009 | |

OTHER PUBLICATIONS

Japanese Office Action dated Aug. 31, 2010 (Two (2) pages).

* cited by examiner

*Primary Examiner* — Hieu T Vo
(74) *Attorney, Agent, or Firm* — Crowell & Moring LLP

(57) ABSTRACT

An engine controller capable of reducing torque fluctuation and the like in change between spark ignition combustion and homogeneous charge compression ignition combustion is provided. Spark ignition burning mode or homogeneous charge compression ignition burning mode is selectively set as burning mode according to the operating state of an engine. In spark ignition burning mode, a spark plug is used. In homogeneous charge compression ignition burning mode, fuel is burned utilizing pressure rise in a combustion chamber in conjunction with the ascent of a piston. The burning mode is changed between these modes. In transition for change between the spark ignition burning mode and the homogeneous charge compression ignition burning mode, the following measure is taken: a period during which the lift amount and/or the valve opening period (IVevent) of an intake valve is made smaller than a set value for the homogeneous charge compression ignition burning mode is provided.

18 Claims, 22 Drawing Sheets

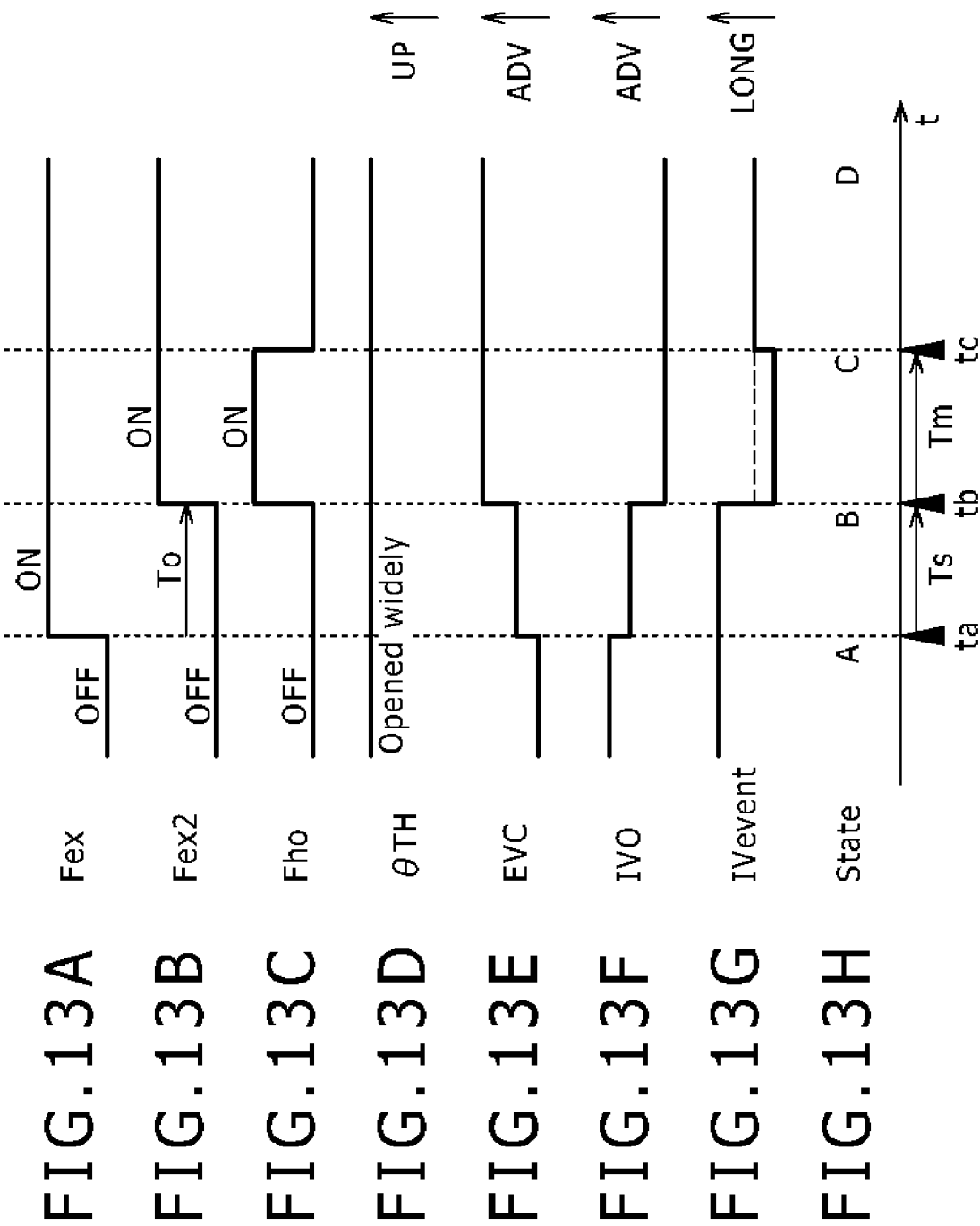

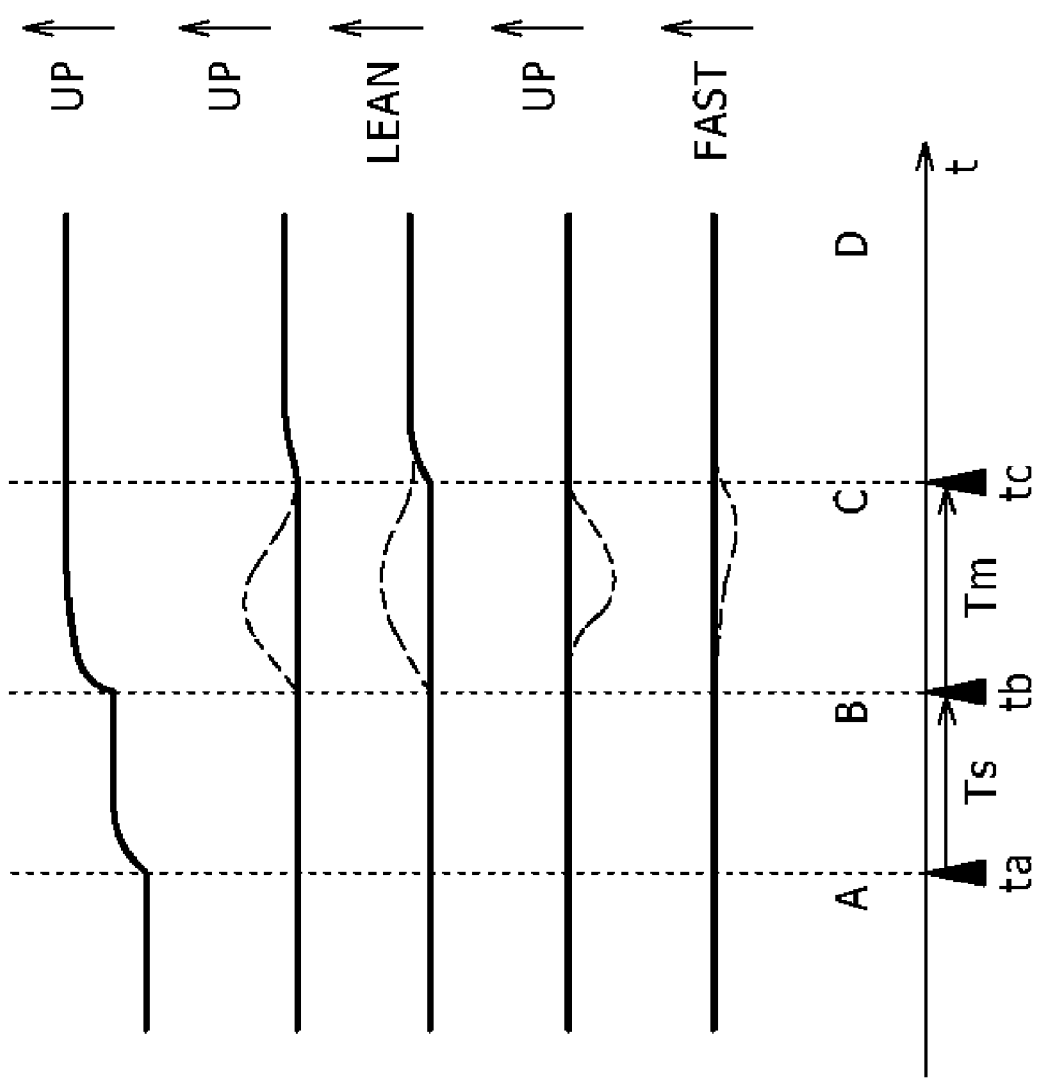

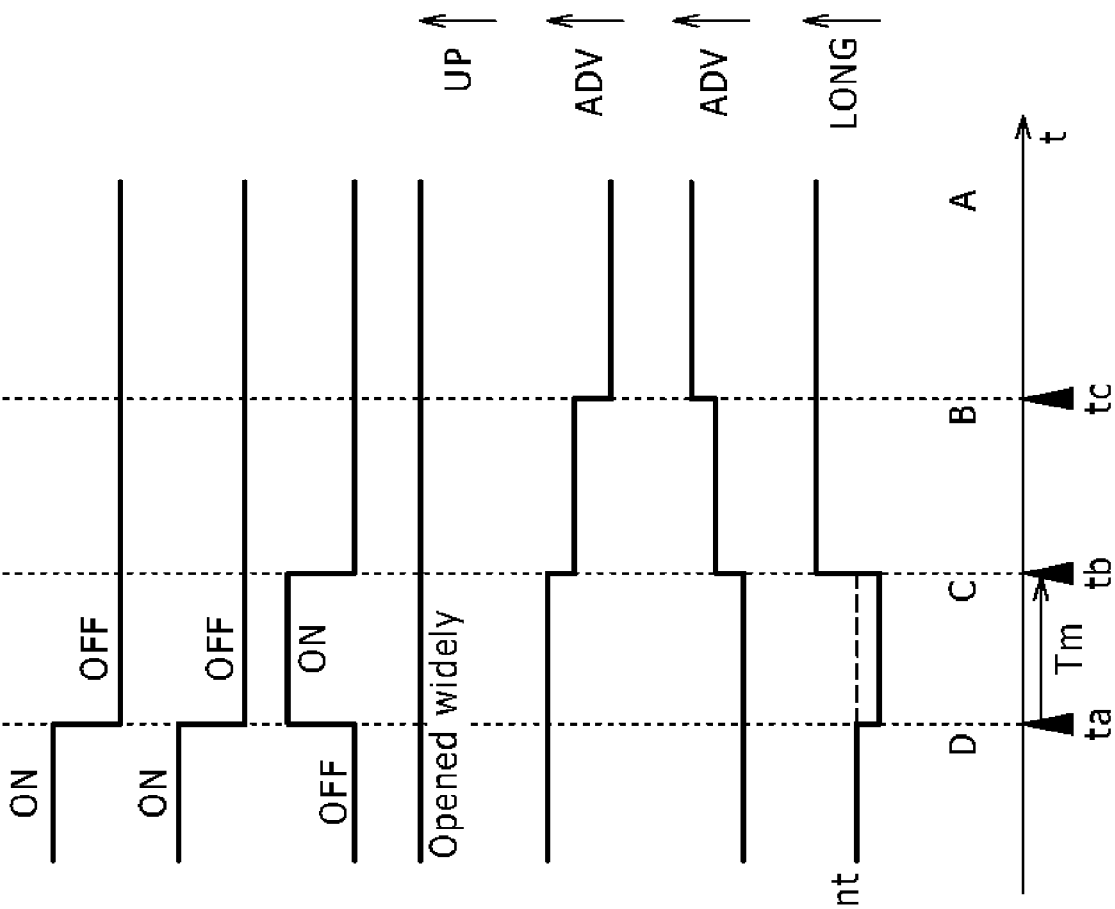

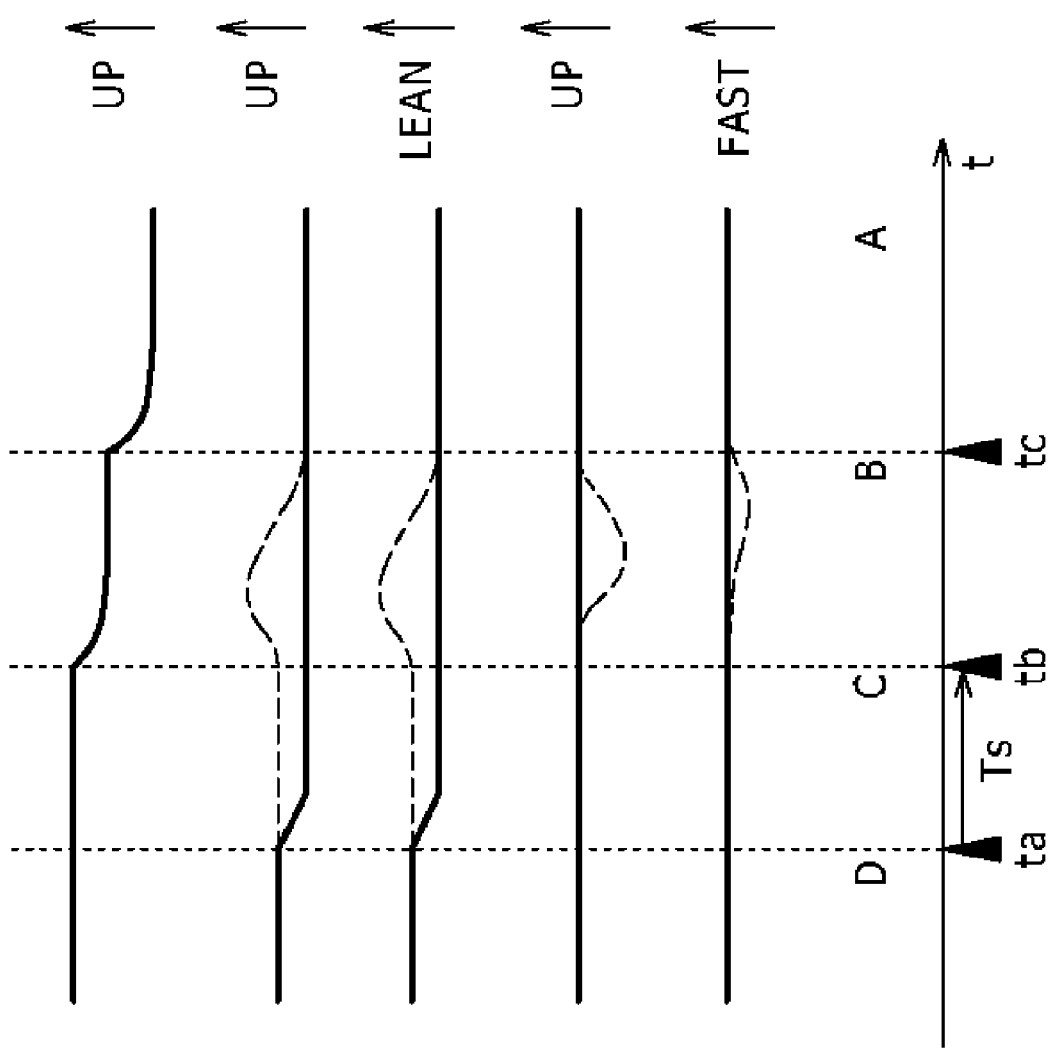

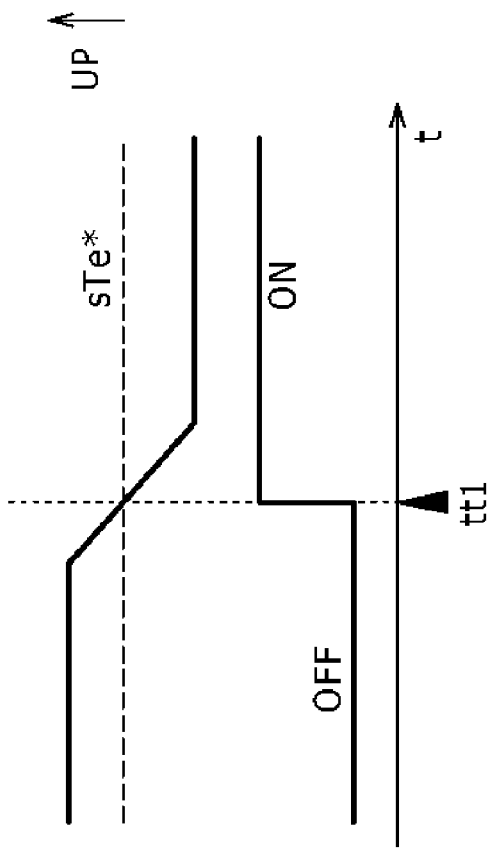
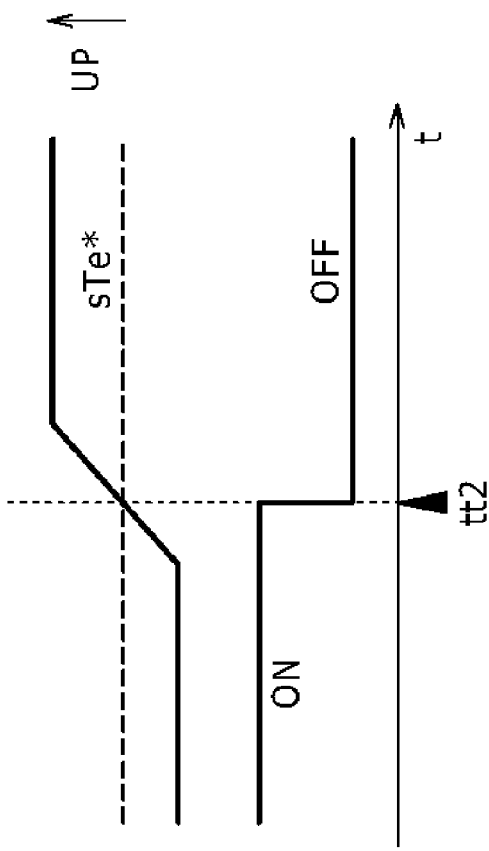
FIG.17A
FIG.17B
FIG.18A
FIG.18B

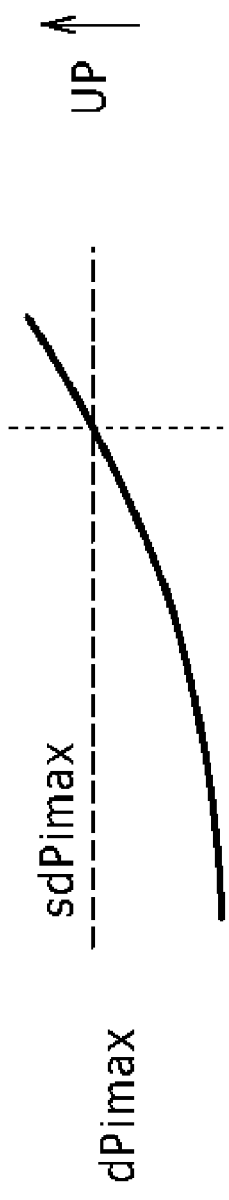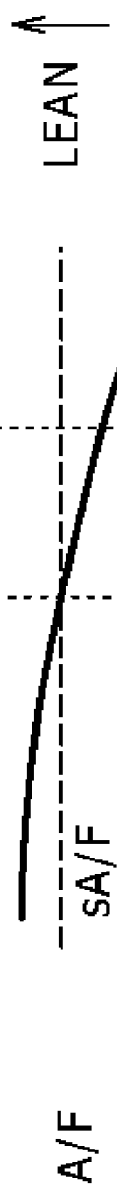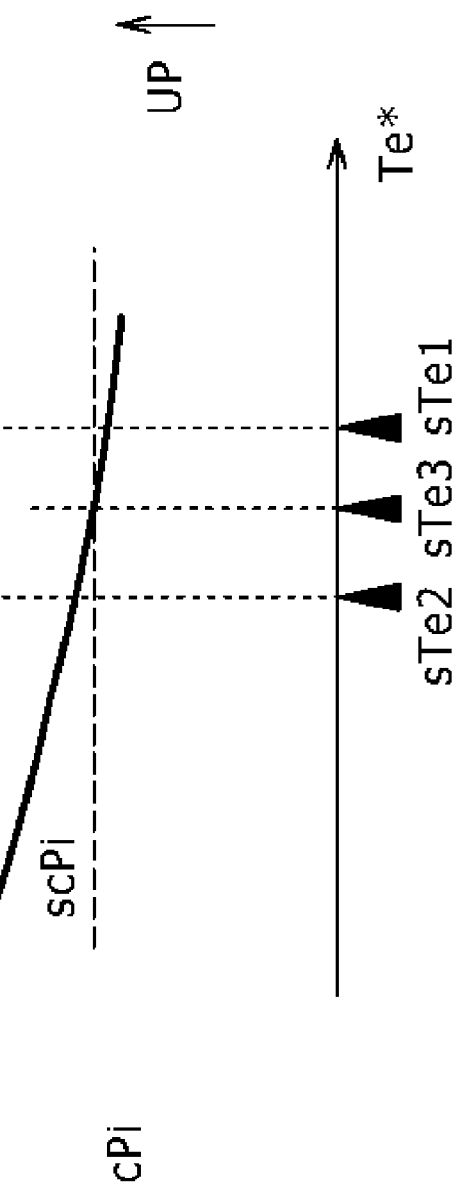
FIG.19A
FIG.19B
FIG.19C

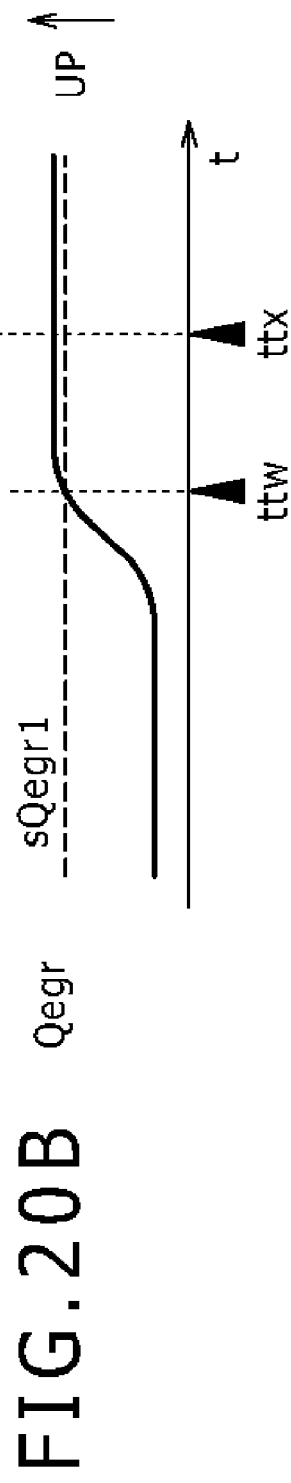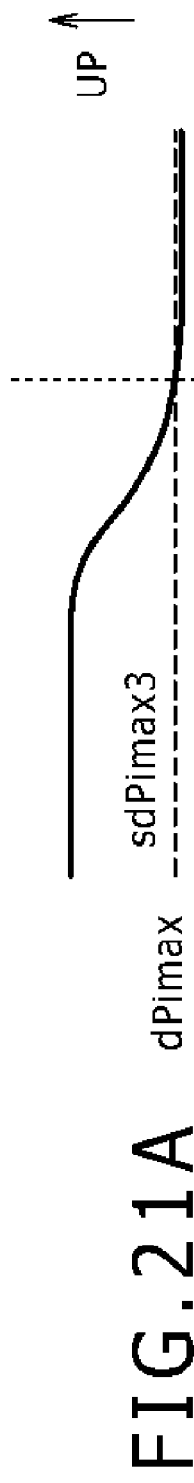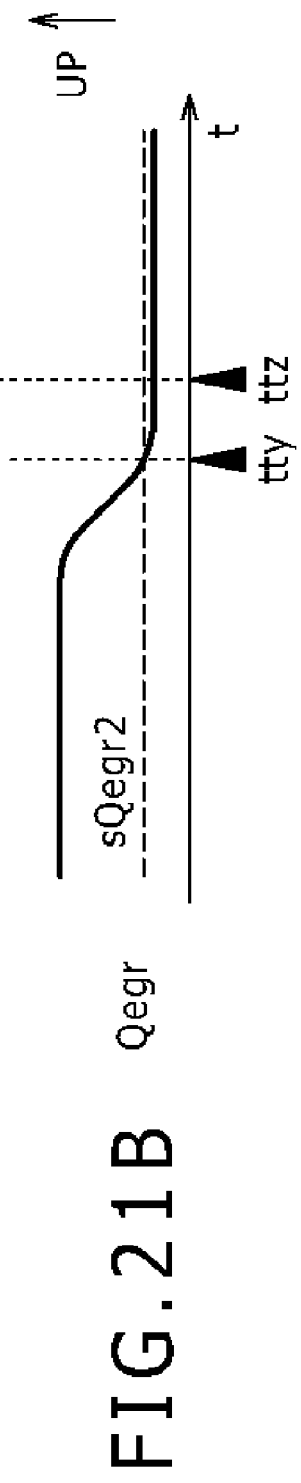

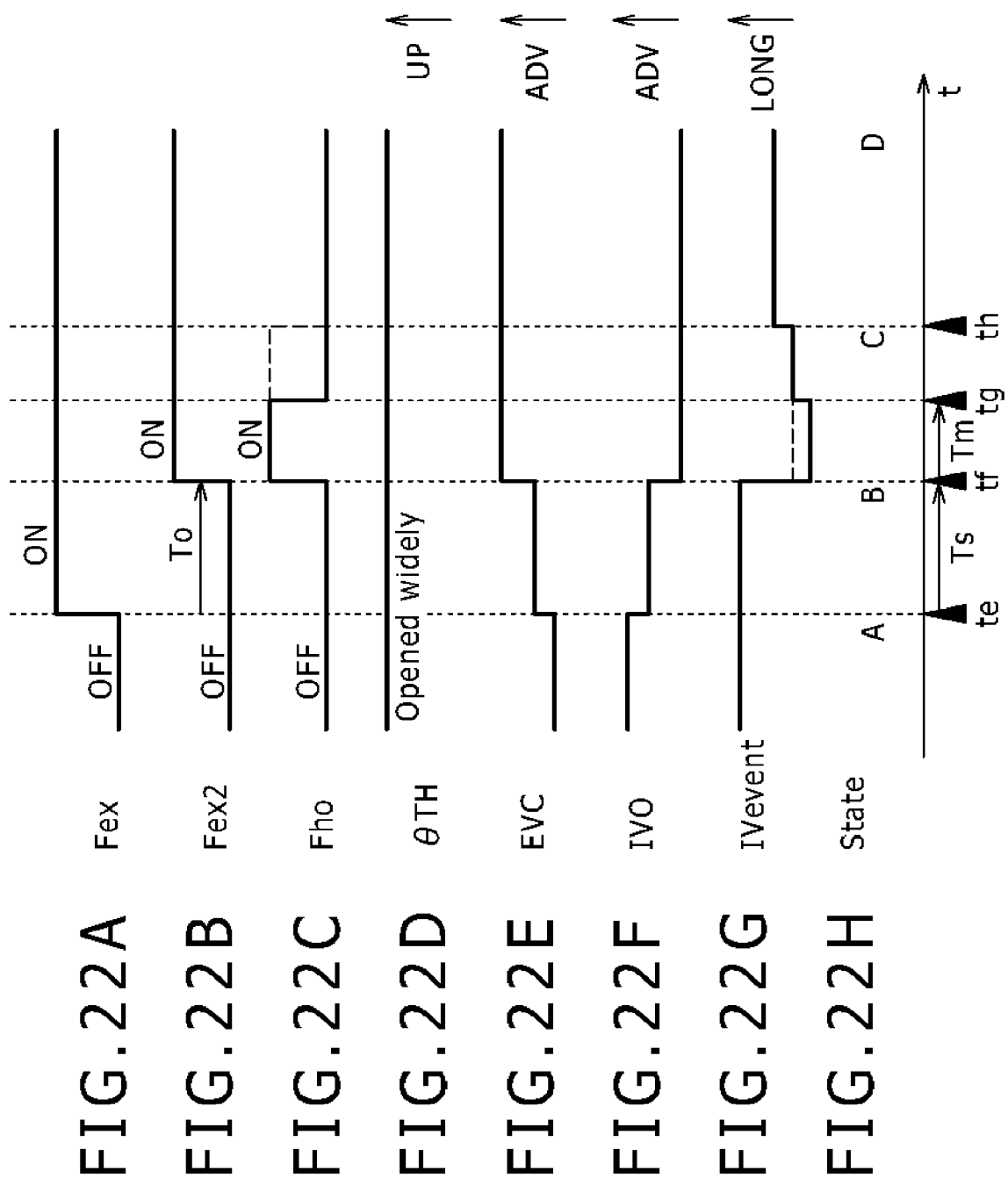

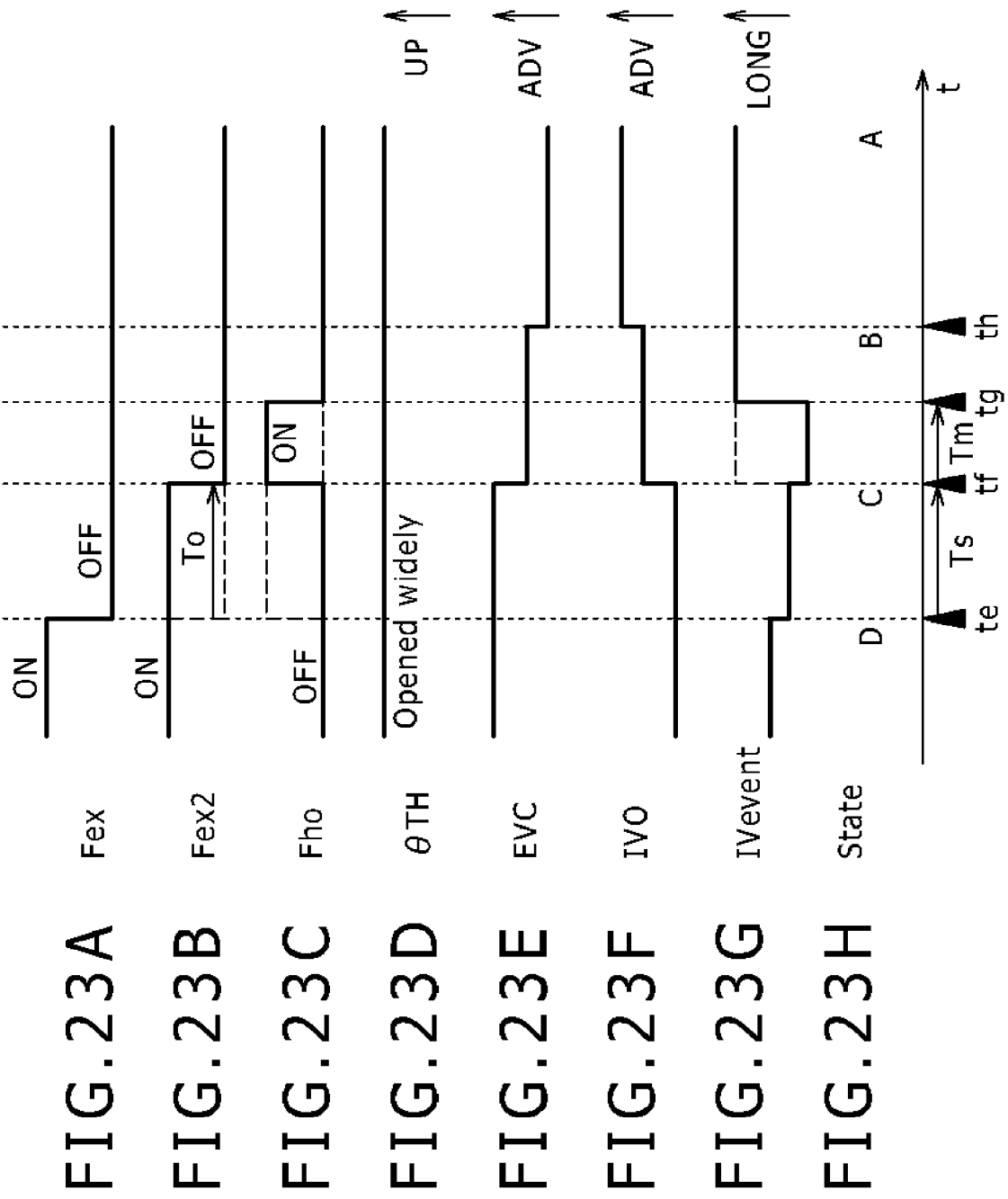

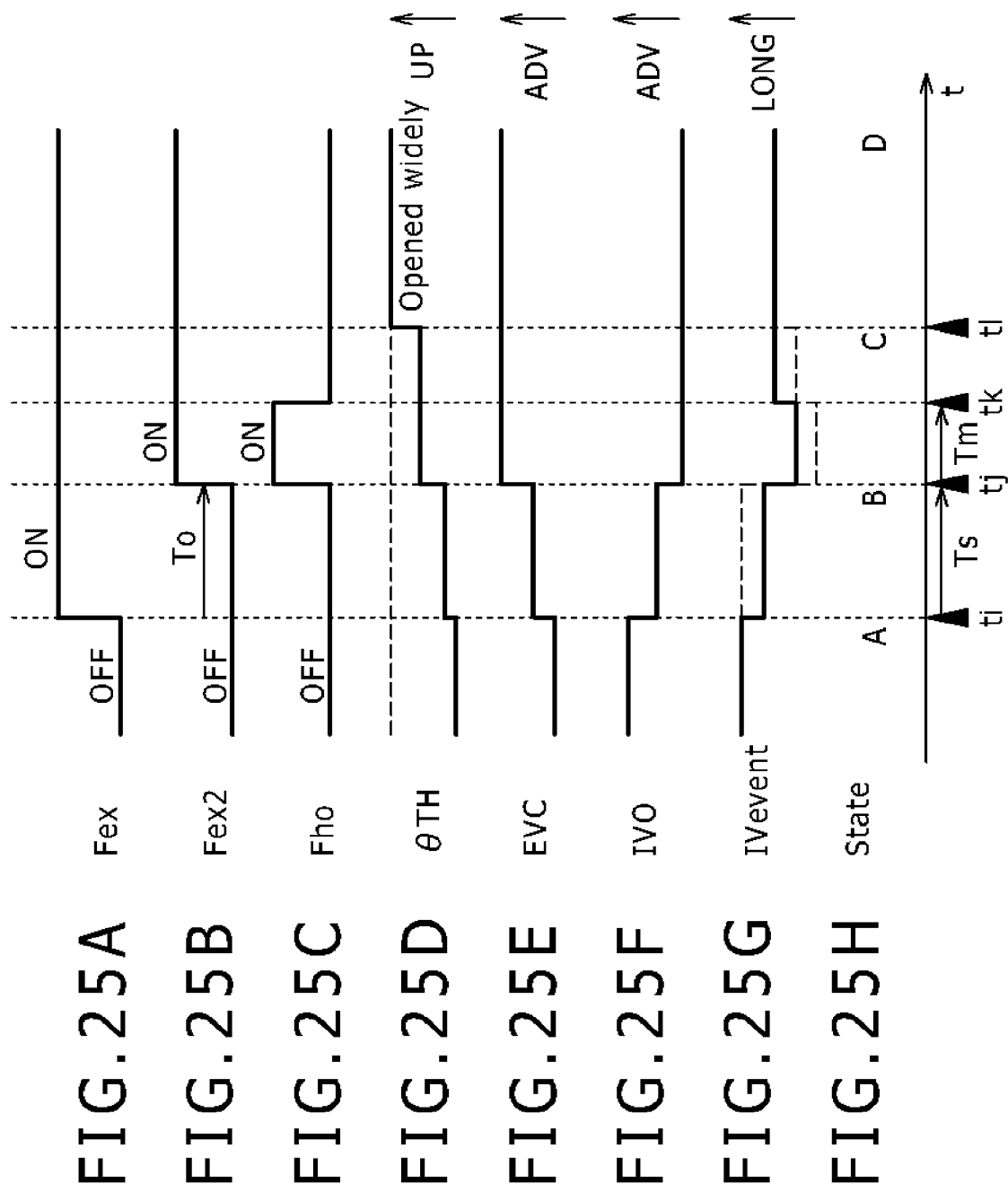

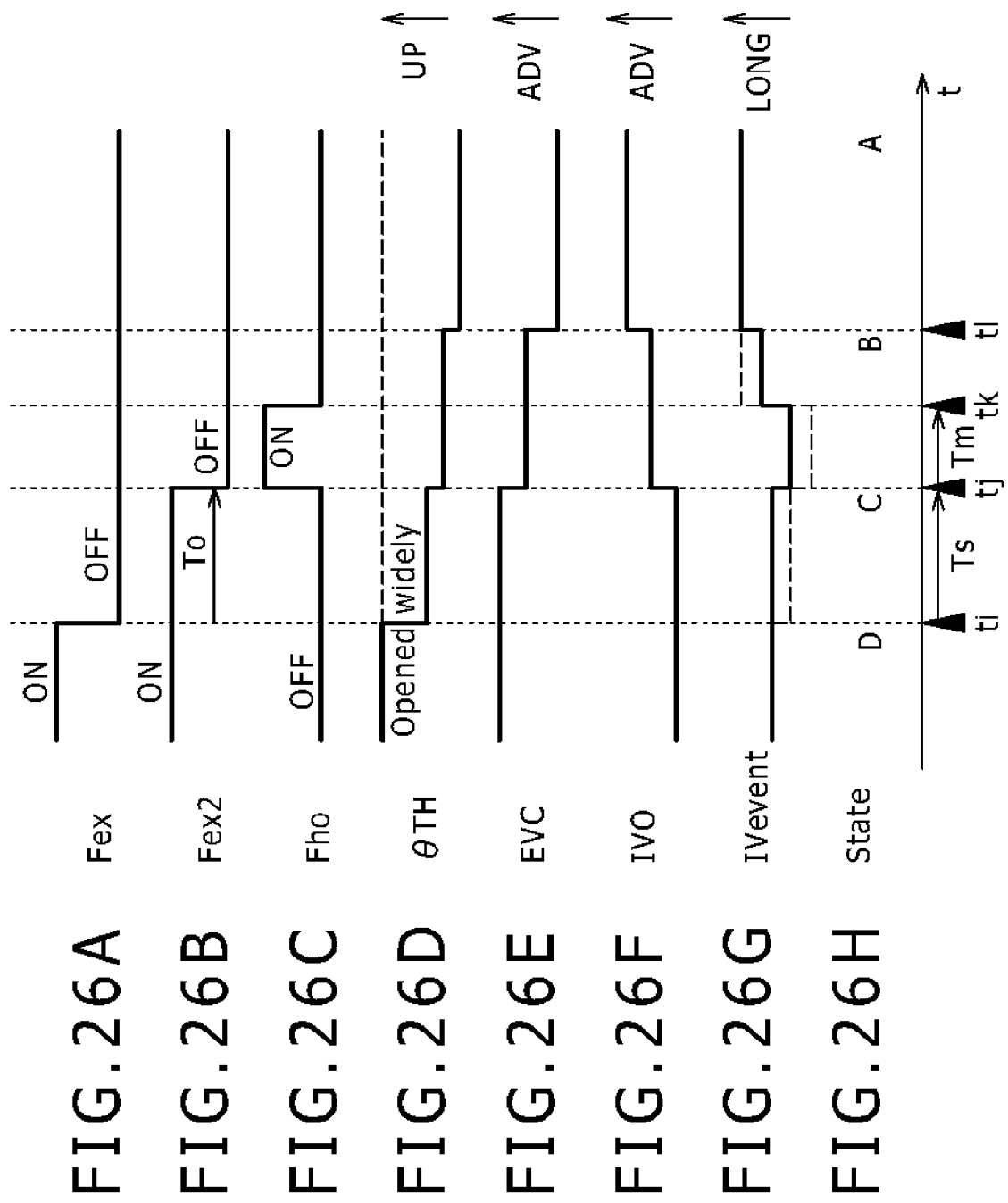

APPARATUS AND METHOD FOR CONTROLLING ENGINE

BACKGROUND OF THE INVENTION

1. Field of the Invention

The present invention relates to apparatuses and methods for controlling an engine favorably mountable on a vehicle and in particular to an apparatus and a method for controlling an engine wherein spark ignition burning mode and homogeneous charge compression ignition burning mode can be selectively established as burning mode.

2. Related Art

As a combustion system for achieving both the enhancement of fuel efficiency performance and the enhancement of exhaust performance (exhaust emission characteristic) in engines (internal combustion engines) used in automobiles and the like, homogeneous charge compression ignition combustion system has received attention. A homogeneous charge compression ignition combustion system compresses an air-fuel mixture composed of fuel (gasoline) and air to cause homogeneous charge compression ignition combustion. In the homogeneous charge compression ignition combustion system, the following can be implemented as compared with the spark ignition combustion system in which an air-fuel mixture is ignited and burned by a spark produced by a spark plug: the enhancement of efficiency by a high compression ratio, the reduction of pump loss, and the reduction of cooling loss by fast burn. Therefore, it is possible to reduce fuel consumption and to reduce the concentration of NOx in exhaust gas by the low-temperature combustion of an air-fuel mixture. For this reason, it is possible to achieve both the enhancement of fuel efficiency performance and the enhancement of exhaust performance.

One of means for implementing homogeneous charge compression ignition combustion is the introduction of EGR. In spark ignition combustion, the air-fuel ratio is relatively rich and it can be carried out in a range in which the EGR rate is relatively low. In homogeneous charge compression ignition combustion to which the above EGR is applied, the air-fuel ratio is relatively lean and it can be carried out in a range in which the internal EGR rate is relatively high. There is a combustion instability range in which both types of combustion are instable between these ranges. The following methods are used to introduce EGR: a method of providing a negative overlap period, which is a period during which both an intake valve and an exhaust valve are closed in the exhaust strokes and thereby leaving combustion exhaust gas (exhaust gas) in a cylinder (combustion chamber) (internal EGR); a method of providing a bypass from an exhaust passage upstream of an intake valve and thereby sucking exhaust gas together with fresh air (external EGR); and a method of opening an exhaust valve in the intake stroke and thereby sucking exhaust gas again (exhaust re-sucking).

When the above homogeneous charge compression ignition combustion system is adopted, a large quantity of exhaust gas is introduced into a combustion chamber and this limits the quantity of fresh air. For this reason, usually, the homogeneous charge compression ignition combustion system is applicable only to the low load side where request engine torque is small. Since it is required to ensure a finite length of time for the chemical reaction of fuel in the strokes of intake, compression, expansion, and exhaust, it is applicable only to the low engine speed side.

For this reason, it is usually required to take the following measure to attain a driver's requested engine torque when a homogeneous charge compression ignition combustion system is applied to an automobile engine: in the low-load, low-rotation range, the engine is operated in homogeneous charge compression ignition burning mode; in the other ranges, the engine is operated in spark ignition burning mode; and in operating range change, the burning mode is changed from homogeneous charge compression ignition burning mode to spark ignition burning mode or from spark ignition burning mode to homogeneous charge compression ignition burning mode.

When the burning mode is changed between spark ignition burning mode and homogeneous charge compression ignition burning mode as mentioned above, engine parameters governing combustion are changed. The engine parameters include: fuel injection mode (the quantity of fuel injected from a fuel injection valve, fuel injection starting time, the number of times of injection in one burning cycle, and the like); firing mode (ignition timing with which a spark is discharged from a spark plug and the like); the opening of a throttle valve for adjusting the quantity of air flowing into a combustion chamber; the lift amount and the valve opening period (a period from when a valve starts to open to when the valve finishes closing) of an intake valve for adjusting the quantity of air flowing into a combustion chamber or an exhaust valve; and the like. Since an actuator that controls engine parameters has a limited response characteristic, the following problem arises: in transition for burning mode change (during mode change), it is brought into the combustion instability range and misfire or torque fluctuation is caused.

As one of measures for solving this problem, the following method is known: in transition for change between spark ignition burning mode and homogeneous charge compression ignition burning mode, a transitional period is set to cope with the combustion instability range. (Refer to Patent Document 1, for example.) In the technology disclosed in Patent Document 1, homogeneous charge compression ignition combustion is carried out by the above-mentioned exhaust re-sucking. The technology involves a variable valve system capable of instantaneously changing the lift amounts of an intake valve and an exhaust valve for carrying out both homogeneous charge compression ignition combustion and spark ignition combustion. The response of air quantity to change in the opening of a throttle valve is slower than the response of gas in a combustion chamber with a valve operating mechanism. Therefore, a TSI range is provided between a homogeneous charge compression ignition combustion range and a spark ignition combustion range. In the TSI range, the lift amount of an intake valve is set to that for homogeneous charge compression ignition burning mode and a throttle valve is widely opened to carry out spark ignition combustion. Combustion is stabilized and torque fluctuation during mode change is reduced by providing the TSI range.

[Patent Document 1] Japanese Unexamined Patent Publication No. 2003-148180 (Japanese Patent No. 3936901)

SUMMARY OF THE INVENTION

During mode change between spark ignition burning mode and homogeneous charge compression ignition burning mode, torque fluctuation can be reduced to some extent by applying the technology disclosed in Patent Document 1. In the above-mentioned disclosed technology, however, the quantity of air flowing into a combustion chamber in spark ignition combustion is adjusted mainly by a throttle valve (normal throttle operation). In recent years, the application of non-throttle operation has been widespread to cope with tightened fuel economy regulations. In the non-throttle operation, a throttle valve is widely opened (for example, fully opened) and the lift amount and/or the valve opening period of an intake valve is continuously varied; and the quantity of air flowing into a combustion chamber is thereby adjusted to carry out spark ignition combustion. In the non-throttle operation, pump loss at a throttle portion can be reduced and thus it is possible to significantly reduce fuel consumption in spark ignition combustion.

However, the technology disclosed in Patent Document 1 involves some problems. It is based on normal throttle operation and a variable valve system capable of continuously adjusting the lift amount and/or the valve opening period of an intake valve that enables non-throttle operation is not assumed. Therefore, spark ignition combustion in non-throttle operation cannot be implemented. Consequently, torque fluctuation or the like caused during transition for change between spark ignition burning mode (non-throttle spark ignition burning mode) and homogeneous charge compression ignition burning mode in non-throttle operation cannot be reduced. In addition, torque fluctuation or the like caused during transition for change between normal throttle spark ignition burning mode and homogeneous charge compression ignition burning mode cannot be sufficiently reduced.

The invention has been made with the above problems associated with conventional technologies taken into account. It is an object of the invention to provide an apparatus and a method for controlling an engine wherein torque fluctuation and the like caused during change between spark ignition burning mode and homogeneous charge compression ignition burning mode can be reduced as much as possible.

To achieve the above object, an engine controller in a first mode of the invention is basically provided with a controlling means for controlling the following: fuel injection by a fuel injection valve, spark ignition by a spark plug, the opening/closing operation of an intake valve, and the like. The controlling means selectively set either of the following modes as burning mode and changes the burning mode between the following modes according to the operating state of the engine: spark ignition burning mode in which the above-mentioned spark plug is used; and homogeneous charge compression ignition burning mode in which fuel is burned utilizing pressure rise in a combustion chamber in conjunction of the lift of a piston. In transition for change between the above-mentioned spark ignition burning mode and the above-mentioned homogeneous charge compression ignition burning mode, the lift amount and/or the valve opening period of the intake valve is made smaller than a set value for the homogeneous charge compression ignition burning mode.

An engine controller in a second mode of the invention basically includes: a fuel injection valve that directly injects fuel into a combustion chamber defined above a piston; a spark plug for igniting and burning fuel in the combustion chamber; an intake valve and an exhaust valve whose lift amount and/or valve opening period can be controlled; and a controlling means for controlling fuel injection by the fuel injection valve, spark ignition by the spark plug, the lift amount and/or the valve opening period of the intake valve and exhaust valve, and the like. The controlling means selectively sets either of the following modes as burning mode and changes the burning mode between the following modes according to the operating state of the engine: non-throttle spark ignition burning mode in which the lift amount and/or the valve opening period of the intake valve is mainly controlled to adjust the quantity of air flowing into the combustion chamber and fuel in the combustion chamber is ignited and burned by the spark plug; and homogeneous charge compression ignition burning mode in which fuel is burned utilizing pressure rise in the combustion chamber in conjunction of the lift of the piston. In transition for change between the non-throttle spark ignition burning mode and the homogeneous charge compression ignition burning mode, the lift amount and/or the valve opening period of the intake valve is made smaller than a set value for the homogeneous charge compression ignition burning mode.

An engine controller in a third mode of the invention basically includes: a fuel injection valve that directly injects fuel into a combustion chamber defined above a piston; a spark plug for igniting and burning fuel in the combustion chamber; an intake valve and an exhaust valve whose lift amount and/or valve opening period can be controlled; a throttle valve capable of controlling the quantity of air flowing into the combustion chamber; and a controlling means for controlling fuel injection by the fuel injection valve, spark ignition by the spark plug, the lift amount and/or the valve opening period of the intake valve and exhaust valve, the opening of the throttle valve, and the like. The controlling means selectively sets either of normal throttle spark ignition burning mode and homogeneous charge compression ignition burning mode as burning mode and changes the burning mode between the these modes according to the operating state of the engine. In normal throttle spark ignition burning mode, the opening of the throttle valve is mainly controlled to adjust the quantity of air flowing into the combustion chamber and fuel in the combustion chamber is ignited and burned by the spark plug. In homogeneous charge compression ignition burning mode, the following operation is performed: the throttle valve is fully or nearly fully opened; the lift amount and/or the valve opening period of the intake valve is mainly controlled to adjust the quantity of air flowing into the combustion chamber; and fuel is burned utilizing pressure rise in the combustion chamber in conjunction with the lift of the piston. In transition for change between the normal throttle spark ignition burning mode and the homogeneous charge compression ignition burning mode, the lift amount and/or the valve opening period of the intake valve is made smaller than a set value for the homogeneous charge compression ignition burning mode.

Other preferred modes for carrying out an engine controller of the invention will be enumerated below:

When the burning mode is changed from the non-throttle spark ignition burning mode to the homogeneous charge compression ignition burning mode, the controlling means sets a first period for which the lift amount and/or the valve opening period of the intake valve is made smaller than the set value.

When the burning mode is changed from the homogeneous charge compression ignition burning mode to the non-throttle spark ignition burning modes the controlling means sets a second period for which the lift amount and/or the valve opening period of the intake valve is made smaller than the set value.

When the burning mode is changed from the normal throttle spark ignition burning mode to the homogeneous charge compression ignition burning mode, the controlling means sets a third period for which the lift amount and/or the valve opening period of the intake valve is made smaller than the set value.

When the burning mode is changed from the homogeneous charge compression ignition burning mode to the normal throttle spark ignition burning mode, the controlling means sets a fourth period for which the lift amount and/or the valve opening period of the intake valve is made smaller than the set value.

The controlling means sets the termination time of the first period so that it is equal to or slightly earlier than the starting time of homogeneous charge compression ignition combustion.

The controlling means sets the termination time of the second period so that it is equal to or slightly earlier than the starting time of spark ignition combustion.

The controlling means sets the termination time of the third period so that it is equal to or slightly earlier than the starting time of homogeneous charge compression ignition combustion.

The controlling means sets the termination time of the fourth period so that it is equal to or slightly earlier than the starting time of spark ignition combustion.

The controlling means sets the starting time of the first period so that it is equal to or later than the time when the request engine torque becomes equal to or lower than a predetermined value.

The controlling means sets the starting time of the third period so that it is equal to or later than the time when the request engine torque becomes equal to or lower than a predetermined value.

The controlling means sets the starting time of the second period so that it is equal to or later than the time when the request engine torque becomes equal to or higher than a predetermined value.

The controlling means sets the starting time of the fourth period so that it is equal to or later than the time when the request engine torque becomes equal to or higher than a predetermined value.

The predetermined value of the request engine torque is set to an engine torque obtained with at least one of three conditions met when the following operation is performed: the engine is operated in the homogeneous charge compression ignition burning mode and at a predetermined number of revolutions and an engine torque equal to or higher than the request engine torque is produced. The three conditions are: the air-fuel ratio should be equal to or lower than a predetermined value; the maximum value of the rate of pressure rise in the combustion chamber should be equal to or higher than a predetermined value; and the amount of cycle-by-cycle variation of combustion should be equal to or higher than a predetermined value.

The controlling means sets the starting time of each of the first, second, third, and fourth periods based on at least one of the following: the temperature, humidity, and atmospheric pressure of air flowing into the combustion chamber, information on the surroundings of a vehicle mounted with the engine, and an output signal from a controller other than the engine controller mounted on the vehicle.

The controlling means sets the lift amount and/or the valve opening period of the intake valve in the transition for mode change based on at least one of the following: the temperature, humidity, and atmospheric pressure of air flowing into the combustion chamber.

The controlling means learns the lift amount and/or the valve opening period of the intake valve in the transition for mode change each time the burning mode is changed.

In a control method for an engine of the invention, basically, either of the following modes is selectively set as burning mode and the burning mode is changed between the following modes according to the operating state of the engine: spark ignition burning mode in which a spark plug is used; and homogeneous charge compression ignition burning mode in which fuel is burned utilizing pressure rise in a combustion chamber in conjunction with the lift of a piston. In transition for change between the spark ignition burning mode and the homogeneous charge compression ignition burning mode, the lift amount and/or the valve opening period of the intake valve is made smaller than a set value for the homogeneous charge compression ignition burning mode.

According to the invention, the following period is provided in transition for change between spark ignition burning mode and homogeneous charge compression ignition burning mode: a period for which the lift amount and/or the valve opening period of the intake valve is made smaller than a set value for the homogeneous charge compression ignition burning mode. Therefore, it is possible to effectively reduce torque fluctuation, misfire, and the like when the burning mode is changed. For this reason, combustion stability is enhanced and it is possible to enhance both fuel efficiency performance and exhaust performance.

BRIEF DESCRIPTION OF THE DRAWINGS

FIGS. 13A to 13H show a time diagram explaining the control of change from spark ignition burning mode to homogeneous charge compression ignition burning mode in the embodiment 1;

FIGS. 14A to 14F show a time diagram illustrating the behavior and the like of each part observed when the burning mode is changed from spark ignition burning mode to homogeneous charge compression ignition burning mode in the embodiment 1;

FIGS. 15A to 15H show a time diagram explaining the control of change from homogeneous charge compression ignition burning mode to spark ignition burning mode in the embodiment 1;

FIGS. 16A to 16F show a time diagram illustrating the behavior and the like of each part observed when the burning mode is changed from homogeneous charge compression ignition burning mode to spark ignition burning mode in the embodiment 1;

FIGS. 17A and 17B show a time diagram illustrating change in request engine torque and burning mode change flag observed when the burning mode is changed from spark ignition burning mode to homogeneous charge compression ignition burning mode in the embodiment 1;

FIGS. 18A and 18B show a time diagram illustrating change in request engine torque and burning mode change flag observed when the burning mode is changed from homogeneous charge compression ignition burning mode to spark ignition burning mode in the embodiment 1;

FIGS. 19A to 19C show a drawing explaining request engine torque, the maximum value of rate of pressure rise, air-fuel ratio, and the rate of cycle-by-cycle variation of combustion in the embodiment 1;

FIGS. 20A and 20B show a time diagram illustrating variation in the maximum value of rate of pressure rise and the amount of internal EGR observed when the burning mode is changed from spark ignition burning mode to homogeneous charge compression ignition burning mode in the embodiment 1;

FIGS. 21A and 21B show a time diagram illustrating variation in the maximum value of rate of pressure rise and the amount of internal EGR observed when the burning mode is changed from homogeneous charge compression ignition burning mode to spark ignition burning mode in the embodiment 1;

FIGS. 22A to 22H show a time diagram explaining the control of change from spark ignition burning mode to homogeneous charge compression ignition burning mode in the embodiment 2;

FIGS. 23A to 23H show a time diagram explaining the control of change from homogeneous charge compression ignition burning mode to spark ignition burning mode in the embodiment 2;

FIGS. 25A to 25H show a time diagram explaining the control of change from spark ignition burning mode to homogeneous charge compression ignition burning mode in the embodiment 3; and FIGS. 26A to 26H show a time diagram explaining the control of change from homogeneous charge compression ignition burning mode to spark ignition burning mode in the embodiment 3.

DETAILED DESCRIPTION OF THE PREFERRED EMBODIMENTS

Hereafter, detailed description will be given to an embodiment of the invention with reference to the drawings.

Figure 1:
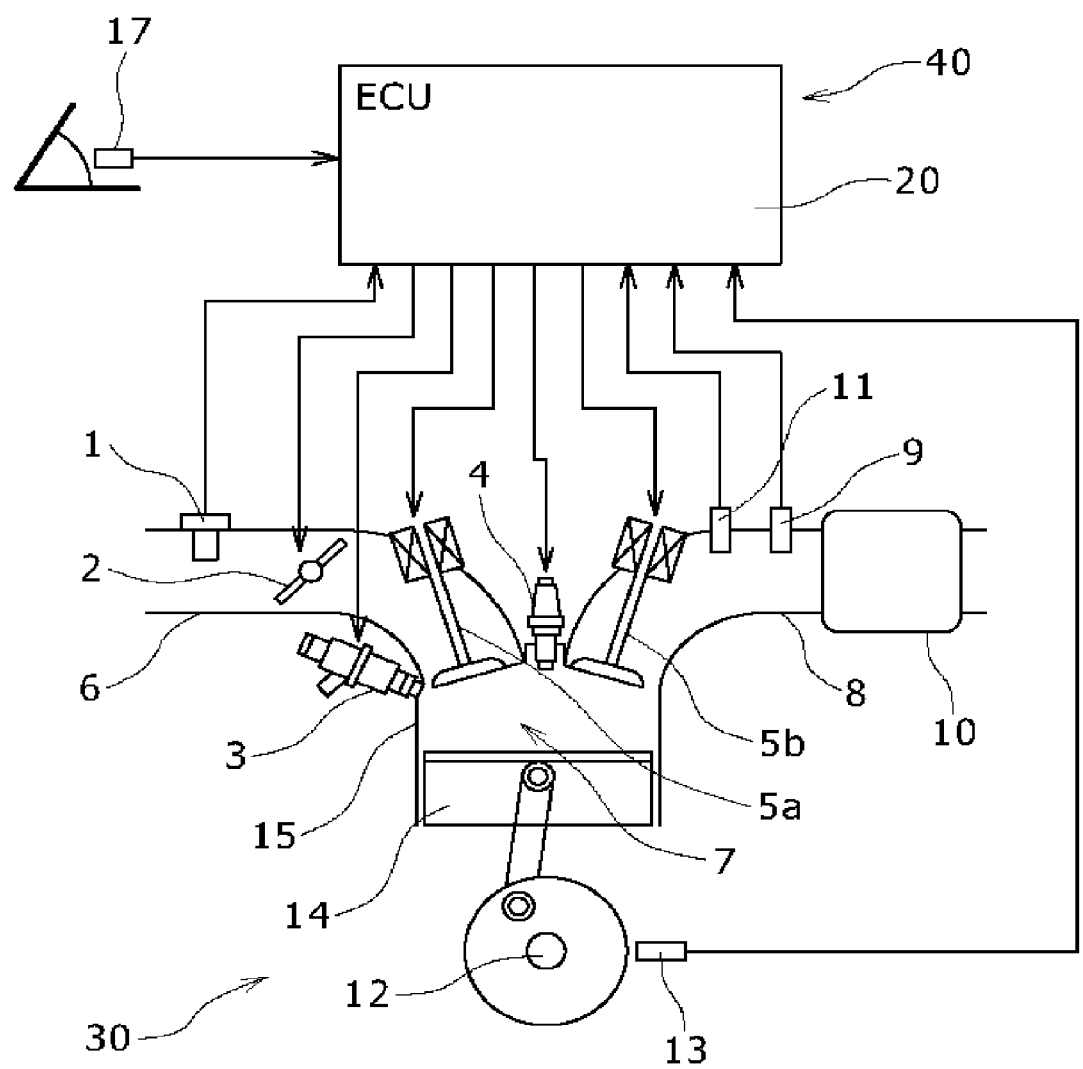
FIG. 1 is a schematic block diagram illustrating a case where a controller in an embodiment of the invention is applied to a gasoline engine for automobiles.

FIG. 1 is a schematic block diagram illustrating a case where a controller in an embodiment of the invention is applied to a gasoline engine for automobiles (common to the embodiments 1 to 3).

In FIG. 1, the engine 30 can take both non-throttle spark ignition burning mode and homogeneous charge compression ignition burning mode. The engine includes: a cylinder 15 comprised of a cylinder block and a cylinder head; a piston 14 slidably fitted in this cylinder 15; and an intake passage 6 and an exhaust passage 8 communicating with a combustion chamber 7 defined above this piston 14 through an intake valve 5a and an exhaust valve 5b.

In the intake passage 6, there are placed an air flow sensor 1 for measuring the quantity of intake air, an electronically controlled throttle valve 2 for adjusting the quantity of air flowing into the combustion chamber 7, and the like. A fuel injection valve 3 for injecting fuel is adjacently provided on the intake side of the combustion chamber 7 and a spark plug 4 for supplying ignition energy is provided in the center of the ceiling of the combustion chamber 7.

The intake valve 5a and the exhaust valve 5b are each comprised of, for example, an electromagnetic on-off valve whose lift amount and valve opening period (period from when the valve starts to open to when the valve finishes closing) are arbitrarily variable. The lift amount and the valve opening period of the intake valve 5a and the exhaust valve 5b are controlled by a control unit (ECU) 20 described later.

In the exhaust passage 8, there are provided a three-way catalyst 10 for purifying exhaust gas, an air-fuel ratio sensor 9 that detects the air-fuel ratio of exhaust gas upstream of the three-way catalyst 10, and an exhaust gas temperature sensor 11 that detects the temperature of exhaust gas upstream of the three-way catalyst 10. On a crankshaft 12, there is provided a crank angle sensor 13 for detecting rotational speed and phase. In addition, there is provided an accelerator opening sensor 17 for detecting the amount of accelerator pedal depression, that is, the opening of an accelerator.

Signals obtained from the air flow sensor 1, air-fuel ratio sensor 9, exhaust gas temperature sensor 11, crank angle sensor 13, accelerator opening sensor 17, and the like are sent to the engine control unit (ECU) 20.

The ECU 20 computes a request torque based on an output signal of the accelerator opening sensor 17. That is, the accelerator opening sensor 17 is used as a request torque detecting means for detecting a torque requested from the engine by a driver. Further, the ECU 20 computes the rotational speed of the engine based on an output signal of the crank angle sensor 13. The ECU 20 computes the major manipulated variables of the engine based on the operating state of the engine obtained from the output of each sensor or the like mentioned above. The major manipulated variables of the engine include intake air quantity, fuel injection quantity, ignition timing, the lift amount and the valve opening period of the intake valve 5a and the exhaust valve 5b, and the like.

A fuel injection quantity computed at the ECU 20 is converted into a valve opening pulse signal and sent to the fuel injection valve 3. A spark plug driving signal is sent to the spark plug 4 so that it is ignited with the ignition timing computed at the ECU 20. A throttle opening computed at the ECU 20 is sent as a throttle driving signal to the electronically controlled throttle valve 2. In addition, the ECU 20 sends driving signals to the intake valve 5a and the exhaust valve 5b with predetermined timing so that these valves are opened and closed with the computed lift amount and valve opening period.

Figure 2:
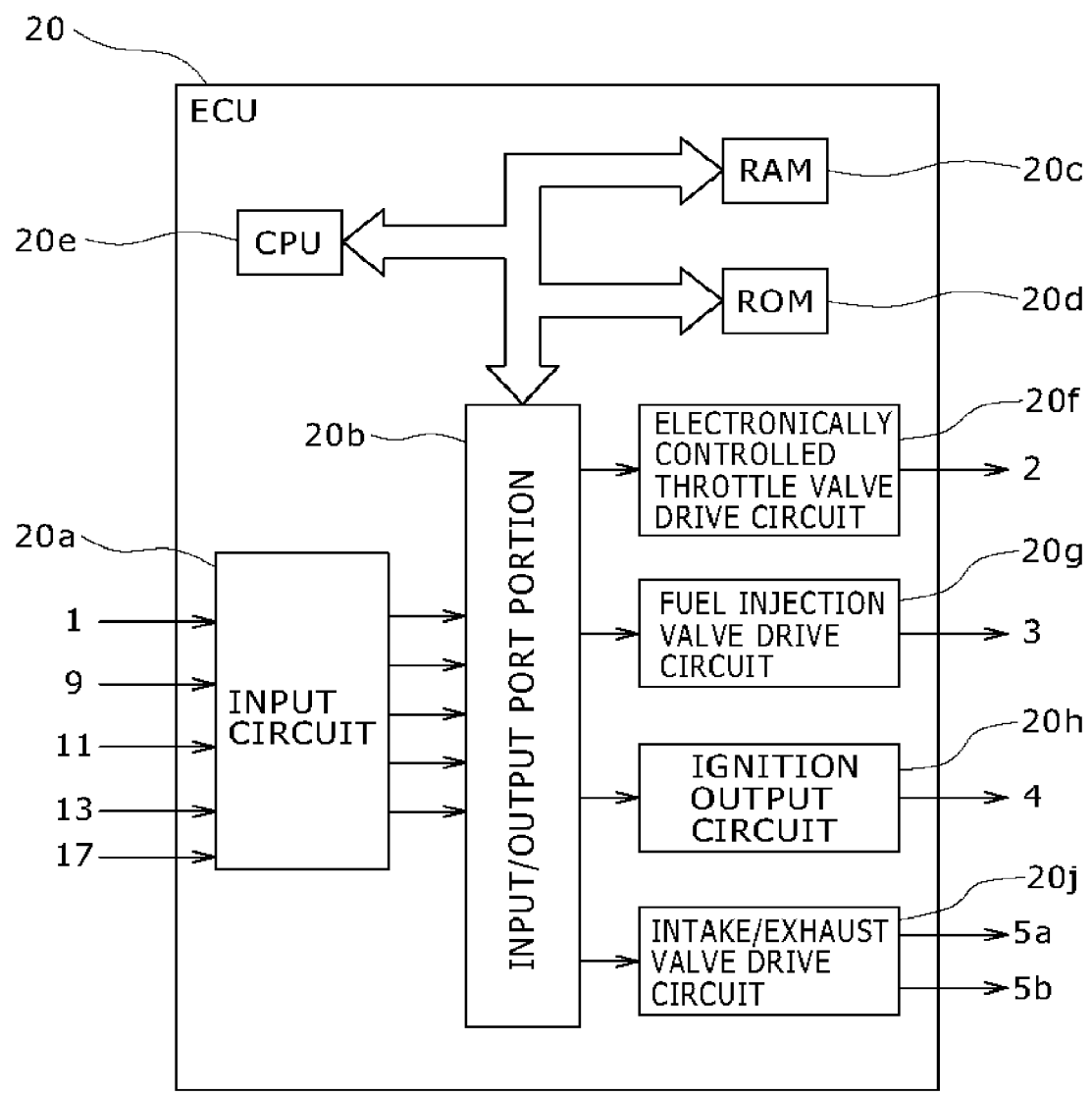
FIG. 2 is a drawing explaining the internal configuration of the ECU illustrated in FIG. 1.

The output signals of the above-mentioned air flow sensor 1, air-fuel ratio sensor 9, exhaust gas temperature sensor 11, and crank angle sensor 13 are inputted to the input circuit 20a of the ECU 20 as illustrated in FIG. 2. However, the input signals are not limited to them. The inputted signal from each sensor or the like is sent to an input port of an input/output port portion 20b. A value sent to an input port of the input/output port portion 20b is stored in RAM 20c and subjected to computation processing at CPU 20e. A control program in which the details of computation processing are described is written to ROM 20d beforehand.

A value indicating a manipulated variable of each actuator computed according to a control program is stored in the RAM 20c and then sent to an output port of the input/output port portion 20*b*. It is then sent to the actuator by way of each drive circuit. In case of this embodiment, the drive circuits include an electronically controlled throttle valve drive circuit 20*f*, a fuel injection valve drive circuit 20*g*, an ignition output circuit 20*h*, and an intake/exhaust valve drive circuit 20*j*. These circuits respectively control the electronically controlled throttle valve 2, fuel injection valve 3, spark plug 4, and intake and exhaust valves 5*a*, 5*b*. This embodiment is a controller provided in the ECU 20 with the above drive circuits. However, the invention is not limited to this embodiment and it may be so embodied that any of the above drive circuits is provided in the ECU 20.

Description will be given to spark ignition burning mode and homogeneous charge compression ignition burning mode in non-throttle operation performed in the engine 30 in this embodiment.

Figure 4:
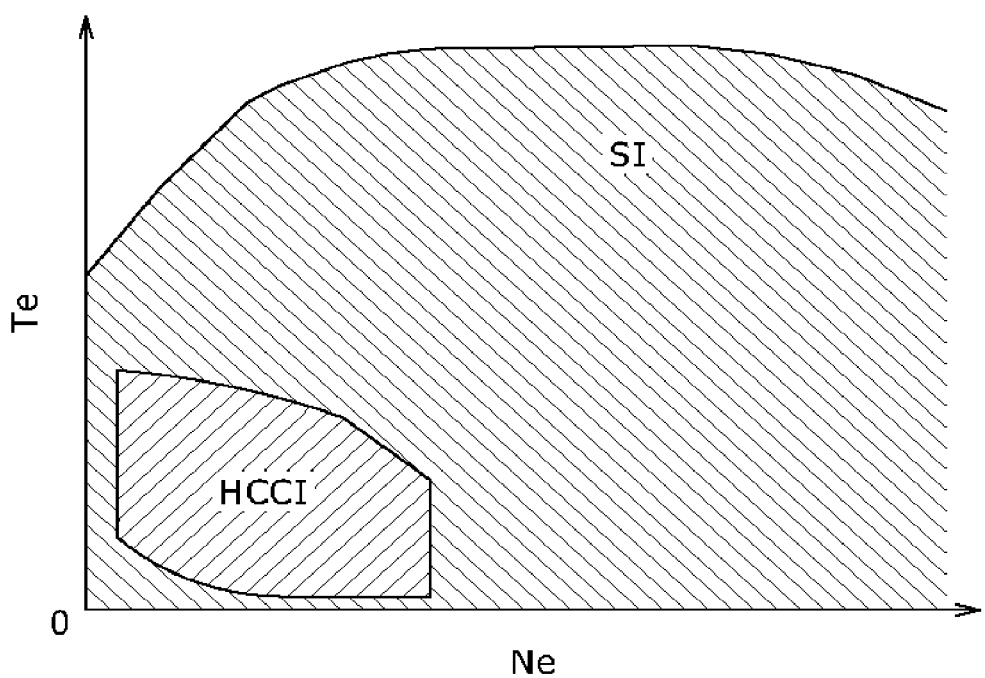
FIG. 4 is a drawing explaining the ranges of spark ignition burning mode and homogeneous charge compression ignition burning mode.

In FIG. 4, the horizontal axis is taken for engine rotational speed Ne and the vertical axis is taken for engine torque Te. The drawing indicates the operating ranges of spark ignition burning mode and homogeneous charge compression ignition burning mode.

The spark ignition burning mode (SI) can be carried out over a wide range in which the engine rotational speed Ne ranges from low rotational speed to high rotational speed and the engine torque Te ranges from low torque to high torque. Meanwhile, methods for implementing homogeneous charge compression ignition burning mode (HCCI) include intake air heating, high compression, the introduction of internal EGR, and the like. With cost and operation in spark ignition burning mode taken into account, the introduction of internal EGR by operating the opening/closing timing (valve opening period) of the intake and exhaust valves 5*a*, 5*b* is highly feasible among these methods. For homogeneous charge compression ignition combustion by the introduction of internal EGR, it is required to increase the amount of internal EGR in the combustion chamber 7. The quantity of fresh air flowing into the combustion chamber 7 is thereby limited and a finite length of time is required for chemical reaction from the formation to the combustion of an air-fuel mixture. For this reason, in natural intake engines, homogeneous charge compression ignition burning mode HCCI can be implemented in low-load, low-rotational speed range as indicated in FIG. 4.

Description will be given to the embodiments 1 to 3 of burning mode change control by the controller 40 in this embodiment.

Embodiment 1

Figure 5:
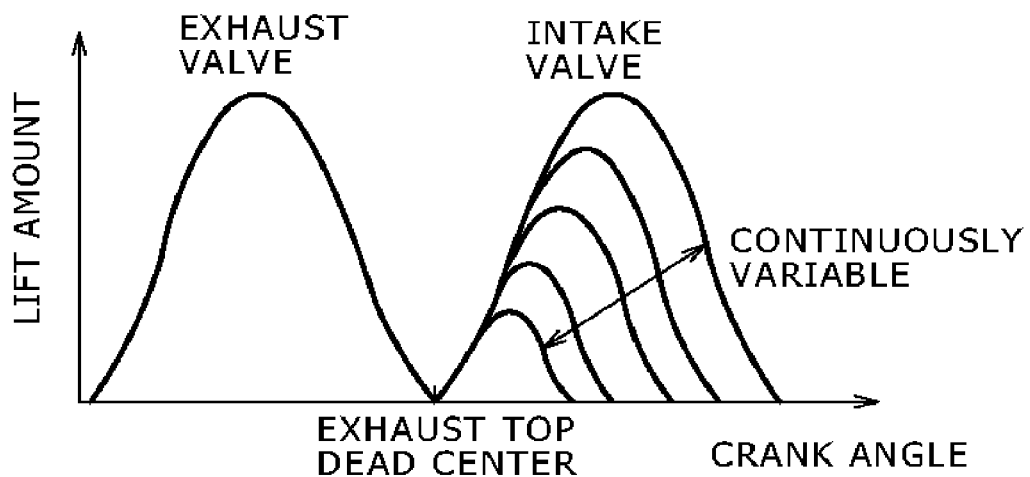
FIG. 5 is a drawing illustrating an operating profile of an intake valve and an exhaust valve in non-throttle spark ignition burning mode in the embodiments 1 and 2.

In an embodiment 1, the intake valve 5*a* and the exhaust valve 5*b* are controlled in spark ignition burning mode by the ECU 20 so that the operating profile illustrated in FIG. 5 is depicted. The throttle valve 2 is fully opened and closing timing of the intake valve 5*a* is adjusted. This simultaneously changes the lift amount and the valve opening period thereof and adjusts the quantity of air flowing into the combustion chamber 7.

Figure 6:
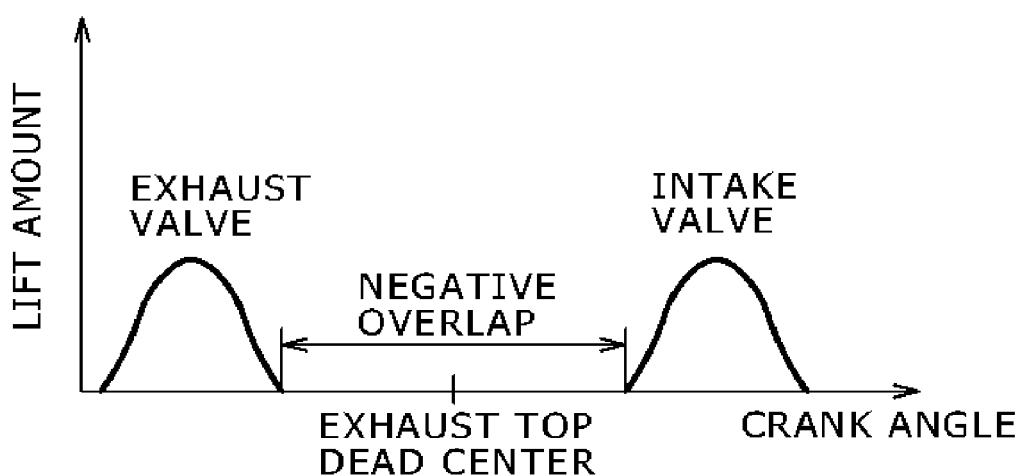
FIG. 6 is a drawing illustrating an operating profile of an intake valve and an exhaust valve in homogeneous charge compression ignition burning mode in the embodiments 1 and 2.

In homogeneous charge compression ignition burning mode, meanwhile, the intake valve 5*a* and the exhaust valve 5*b* are so controlled that the operating profile illustrated in FIG. 6 is depicted. In homogeneous charge compression ignition burning mode, the amount of internal EGR is adjusted by adjusting a negative overlap period. Also in homogeneous charge compression ignition burning mode, the throttle valve 2 is fully opened.

Figure 3:
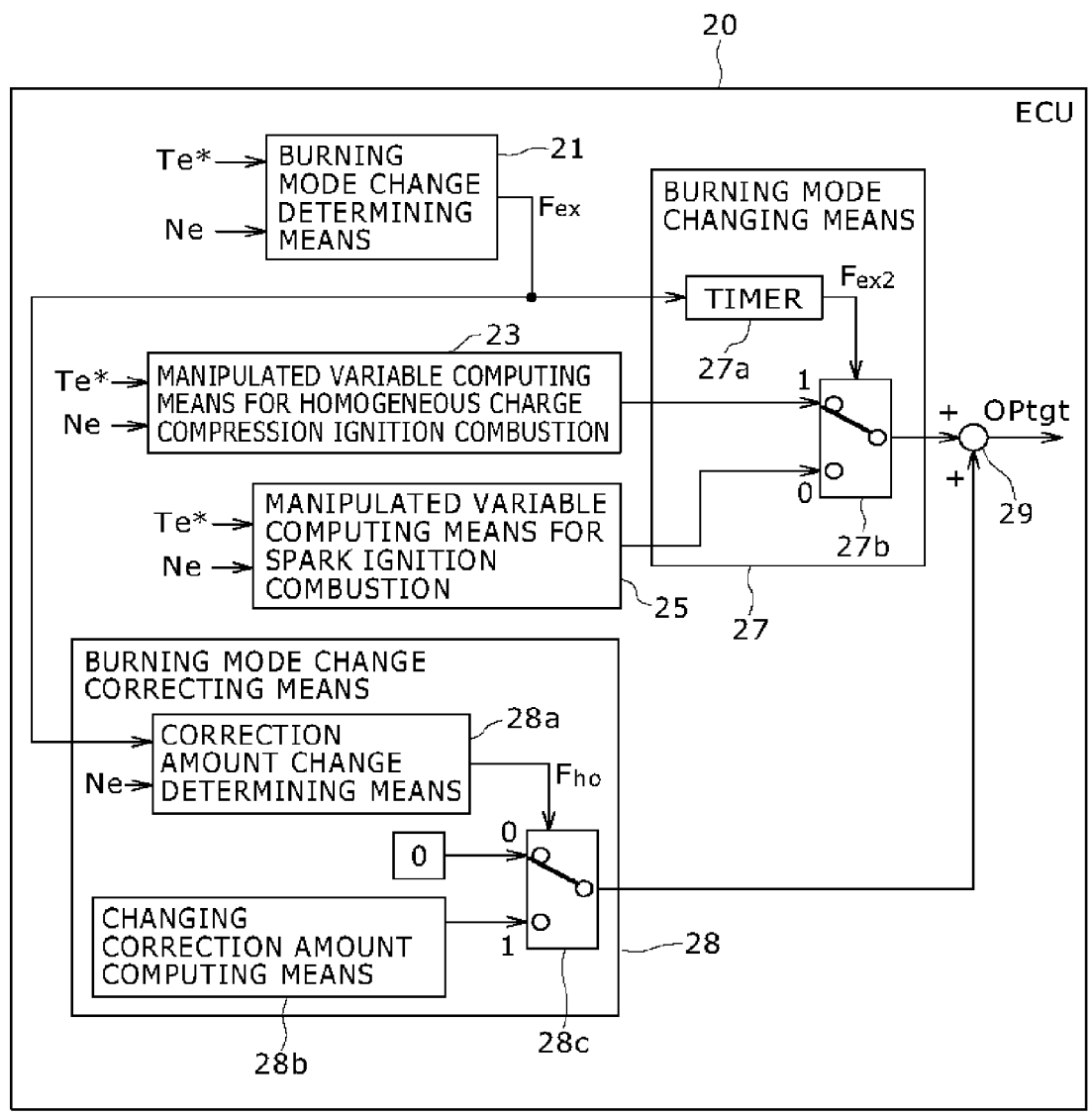
FIG. 3 is a control system diagram of the controller illustrated in FIG. 1.

FIG. 3 is a control system diagram illustrating burning mode change carried out by the ECU 20.

In this embodiment, the ECU 20 carries out control to suppress degradation in running performance when the mode is changed between spark ignition burning mode and homogeneous charge compression ignition burning mode. More specific description will be given. In transition for burning mode change, a period for which the valve opening period of the intake valve 5*a* is made equal to or smaller than a set value for homogeneous charge compression ignition burning mode is provided. Fluctuation in air quantity during transition for change is thereby suppressed to reduce torque fluctuation and the like during transition for burning mode change.

This will be described below. The ECU 20 functionally includes: a burning mode change determining means 21; a manipulated variable computing means 23 for homogeneous charge compression ignition combustion; a manipulated variable computing means 25 for spark ignition combustion; a burning mode changing means 27; a burning mode change correcting means 28; and an adding means 29. The means illustrated in the drawing are used in burning mode change control and other means and configurations are omitted from the drawing.

The burning mode change determining means 21 determines whether or not the burning mode can be changed based on a request engine torque Te* requested from the engine 30 and engine rotational speed Ne and sets a burning mode change flag Fex. As mentioned above, the request engine torque Te* is separately computed at the ECU 20 based on an accelerator opening detected by the accelerator opening sensor 17.

The burning mode change determining means 21 has a range map indicated by engine torque Te and engine rotational speed Ne, for example, as illustrated in FIG. 4. It will be assumed that the engine is being operated in spark ignition burning mode. In this case, when it is determined that the request engine torque Te* and the engine rotational speed Ne have entered the homogeneous charge compression ignition combustion (feasible) range HCCI in the map illustrated in FIG. 4, the following takes place: the burning mode change determining means 21 sets the burning mode change flag Fex to ON (=1). It will be assumed that the engine is being operated in homogeneous charge compression ignition burning mode. In this case, when it is determined that the request engine torque Te* and the engine rotational speed Ne have entered the spark ignition combustion range SI in the map illustrated in FIG. 4, the following takes place: the burning mode change determining means 21 sets the burning mode change flag Fex to OFF (=0). The burning mode change flag Fex is outputted to the burning mode changing means 27 and the burning mode change correcting means 28. In the boundary between the homogeneous charge compression ignition combustion range HCCI and the spark ignition combustion range SI, a dead band having a predetermined width is set to prevent so-called hunting.

The manipulated variable computing means 23 for homogeneous charge compression ignition combustion performs the following operation based on the request engine torque Te* and the engine rotational speed Ne: it computes a manipulated variable of an engine parameter required for homogeneous charge compression ignition combustion. Possible engine parameters include: the quantity of fuel injected from the fuel injection valve 4; fuel injection start timing; ignition start timing with which discharge of an ignition spark from the spark plug 4 is started; the opening of the throttle valve 2; the lift amount and the valve opening period of the intake valve 5*a* and the exhaust valve 5*b*; and the like.

The manipulated variable computing means 25 for spark ignition combustion computes a manipulated variable of an engine parameter required for spark ignition combustion based on the request engine torque Te* and the engine rotational speed Ne.

The burning mode changing means 27 is comprised of: a timer 27a that carries out timer processing on the burning mode change flag Fex from the burning mode change determining means 21; and a selecting means 27b that selects either of the following according to the flag Fex2 obtained as the result of the timer processing: a manipulated variable for homogeneous charge compression ignition combustion from the manipulated variable computing means 23 for homogeneous charge compression ignition combustion; and a manipulated variable for spark ignition combustion from the manipulated variable computing means 25 for spark ignition combustion. At the timer 27a, Fex2 is changed with a predetermined time delay after the burning mode change flag Fex is changed. Specifically, Fex2 is changed from OFF (=0) to ON (=1) at time tb when a predetermined time To has passed after time ta when Fex was changed from OFF (–0) to ON (=1) as illustrated in FIGS. 13A to 13H. At the selecting means 27b, the following operation is performed: when the burning mode change flag Fex2 is ON (=1), a manipulated variable for homogeneous charge compression ignition combustion is selected; and when the burning mode change flag Fex2 is OFF (=0), a manipulated variable for spark ignition combustion is selected.

Further, the ECU 20 includes the burning mode change correcting means 28 that operates when the burning mode is changed between spark ignition burning mode and homogeneous charge compression ignition burning mode. The burning mode change correcting means 28 includes: a correction amount change determining means 28a; a changing correction amount computing means 28b; and a changing correction amount selecting means 28c.

The correction amount change determining means 28a is inputted with the burning mode change flag Fex. When the burning mode change flag is changed from OFF (=0) to ON (=1) during spark ignition combustion, the correction amount change determining means performs the following operation: it sets OFF (=0) in flag Fho until a certain time Ts passes; it sets ON (=1) in flag Fho during a predetermined time Tm after time tb when Ts has passed; and it sets OFF (=0) after Tm has passed. The predetermined time Tm is varied according to engine rotational speed Ne. For example, when the engine rotational speed is low, it is set to 100 ms or so; and when the engine rotational speed is high, it is set to 300 ms or so.

The changing correction amount computing means 28b computes a correction amount for a manipulated variable for spark ignition combustion in transition for change between spark ignition burning mode and homogeneous charge compression ignition burning mode and outputs the computed correction amount.

The changing correction amount selecting means 28c operates as described below. When the output of the correction amount change determining means 28a is ON (=1), it selects a correction amount for a manipulated variable for spark ignition combustion outputted by the changing correction amount computing means 28b and outputs it to the adding means 29. When the output of the correction amount change determining means 28a is OFF (=0), it selects 0 as correction amount and outputs it to the adding means 29.

The adding means 29 adds the result of output from the burning mode change correcting means 28 to a value selected at the burning mode changing means 27. It then outputs the result of addition as a target manipulated variable OPtgt to the electronically controlled throttle valve drive circuit 20f, fuel injection valve drive circuit 20g, ignition output circuit 20h, intake/exhaust valve drive circuit 20j, and the like in FIG. 2.

As a result, the engine 30 is operated in either homogeneous charge compression ignition burning mode or spark ignition burning mode so that the request engine torque Te* is outputted.

The target manipulated variable OPtgt is any of the following operated when the engine 30 is controlled: the opening of the throttle valve 2 (throttle opening); the width of fuel injection pulse to or the timing of fuel injection of the fuel injection valve 3; the timing of ignition by the spark plug 4; the opening timing and valve opening period of the intake valve 5a; and the opening/closing timing of the exhaust valve 5b.

The predetermined time Ts and the predetermined time Tm may be preset or may be set according to the above-mentioned engine parameters. More specifically, they may be a period for which the amount of internal EGR of the intake valve 5a or the exhaust valve 5b should be increased or decreased by a predetermined amount. They may be set by setting the state of combustion in the combustion chamber 7 based on the result of output from a sensor. More specifically, they may be a period during which the maximum value of rate of pressure rise was increased or decreased by a predetermined amount based on the output value of a pressure sensor for directly detecting the pressure in the combustion chamber 7.

The following description will be based on the assumption that the predetermined time Ts and the predetermined time Tm are preset periods. In addition, it will be assumed that the predetermined time To and the predetermined time Ts are substantially equal to each other.

In the embodiment 1, the changing correction amount outputted from the changing correction amount computing means 28b and added to a manipulated variable from the manipulated variable computing means 25 for spark ignition combustion is the valve opening period of the intake valve 5a.

Description will be given to burning mode change control in this embodiment with reference to FIG. 7.

Figure 7:
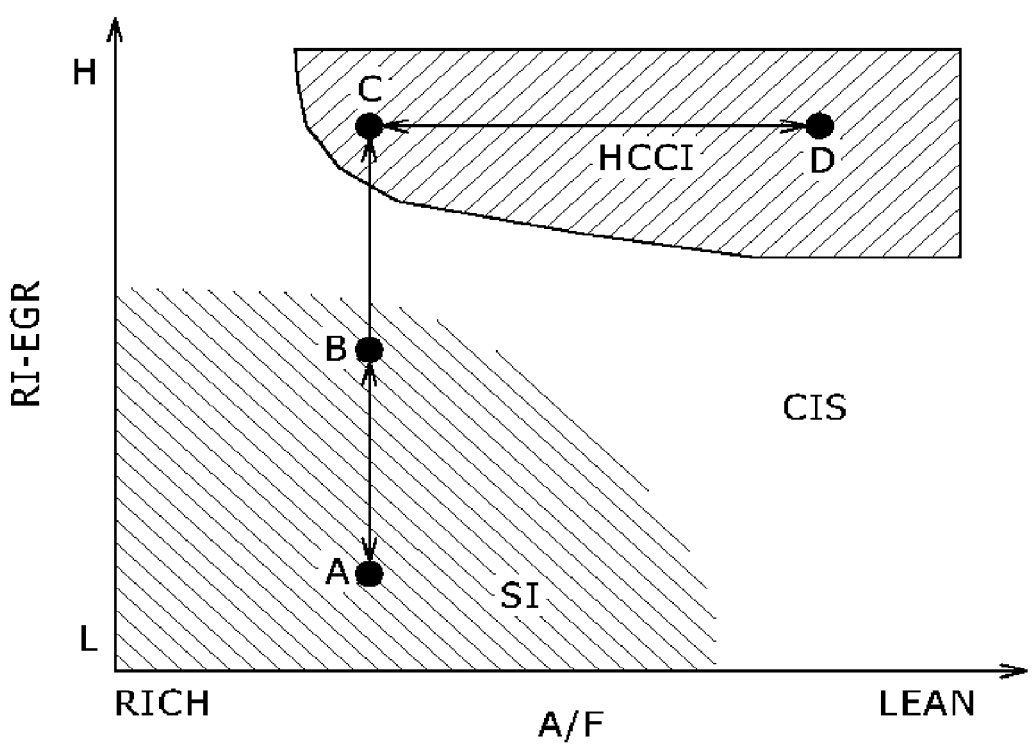
FIG. 7 is a drawing explaining burning mode change control is the embodiments 1, 2, and 3.

In FIG. 7, the horizontal axis is taken for air-fuel ratio A/F. On the right side of the drawing, F/A is leaner Le than the stoichiometric air fuel ratio=14.7; and the on the left side, F/A is richer Ri. The vertical axis is taken for internal EGR rate RI-EGR. The internal EGR rate is higher on the upper side of the drawing and lower on the lower side.

The drawing indicates the following ranges when attention is focused on the air-fuel ratio A/F and the internal EGR rate RI-EGR in a combustion chamber 7 in a natural intake engine in which homogeneous charge compression ignition combustion is implemented by the introduction of internal EGR: the spark ignition combustion range SI and the homogeneous charge compression ignition combustion range HCCI. However, it will be assumed that the engine torque and the engine rotational speed are substantially constant throughout the entire ranges. Further, it will be assumed that the fuel injection timing in the spark ignition combustion range SI occurs in the intake stroke and the fuel injection timing in the homogeneous charge compression ignition combustion range HCCI occurs in the negative overlap period, in the intake stroke, or in both of them.

In FIG. 7, the spark ignition combustion range SI is a range in which the air-fuel ratio A/F is relatively rich and the internal EGR rate RI-EGR is relatively low. Meanwhile, the homogeneous charge compression ignition combustion range HCCI is a range in which the air-fuel ratio A/F is relatively lean and the internal EGR rate RI-EGR is relatively high.

Between these combustion ranges, there is a combustion instability range CIS in which both types of combustion are instable.

In this embodiment, for example, the following operation is performed when the burning mode is changed (in transition for change) from spark ignition burning mode to homogeneous charge compression ignition burning mode. The combustion is caused to transition from a state in which the engine is being operated in the spark ignition combustion range SI in which the air-fuel ratio A/F is in proximity to 14.7 and the internal EGR rate RI-EGR is low as at point A. The air-fuel ratio is kept substantially constant and the internal EGR rate RI-EGR is increased to cause the combustion to transition to a state at point B. Thereafter, the air-fuel ratio is kept substantially constant and the internal EGR rate RI-EGR is further increased to cause the combustion to transition from the state at point B to point C in the homogeneous charge compression ignition combustion range HCCI. However, the combustion instability range CIS exists between the spark ignition combustion range SI and the homogeneous charge compression ignition combustion range HCCI. In transition from point B to point C, the combustion state is greatly changed. Therefore, engine parameters, especially, the opening/closing timing of the intake valve 5a and the exhaust valve 5b is greatly changed. Therefore, the state (A/F and the like) of gas in the combustion chamber may largely fluctuate. If A/F largely fluctuates, combustion is prone to transition to the instability range CIS and a result, there is a high possibility that misfire will be caused. For this reason, transition from point B to point C requires technologies for suppressing fluctuation in air quantity and the amount of internal EGR. After transition from point B to point C, the air-fuel ratio A/F is shifted to point D on the leaner side within the homogeneous charge compression ignition combustion range HCCI. As a result, the burning mode is changed from spark ignition burning mode to homogeneous charge compression ignition burning mode.

When the purification of NOx in exhaust gas components at the three-way catalyst 10 is taken into account, it is desirable to set A/F to 14.7. However, since the amount of produced Nox is low in homogeneous charge compression ignition burning mode, A/F need not be 14.7. Also with respect to the internal EGR rate RI-EGR at point C, it need not be equal to that at point D and may be varied according to the operating state of the engine 30.

When the burning mode is conversely changed (in transition for change) from homogeneous charge compression ignition burning mode to spark ignition burning mode, the operation reverse to the foregoing is performed. The combustion is caused to transition from a state in which the air-fuel ratio A/F is on the lean side in the homogeneous charge compression ignition combustion range HCCI as at point D to point C. At point C, the air-fuel ratio A/F is approximately 14.7 in the homogeneous charge compression ignition combustion range HCCI. Thereafter, the combustion is caused to transition from point C to point B in the spark ignition combustion range SI at which the internal EGR rate RI-EGR is low and the air-fuel ratio A/F is approximately 14.7. Subsequently, the internal EGR rate RI-EGR is reduced to cause the combustion to transition to point A. As a result, the burning mode is changed from homogeneous charge compression ignition burning mode to spark ignition burning mode.

Transition from homogeneous charge compression ignition burning mode to spark ignition burning mode is similar with transition from spark ignition burning mode to homogeneous charge compression ignition burning mode. That is, in transition from point C to point B, the state of gas in the combustion chamber is prone to largely fluctuate and a technology for suppressing the fluctuation is required.

Concrete description will be given to the control of burning mode change between spark ignition burning mode and homogeneous charge compression ignition burning mode with reference to the flowcharts in FIG. 8 to FIG. 12 and the time diagrams in FIGS. 13A to 13H and the following drawings.

Figure 8:
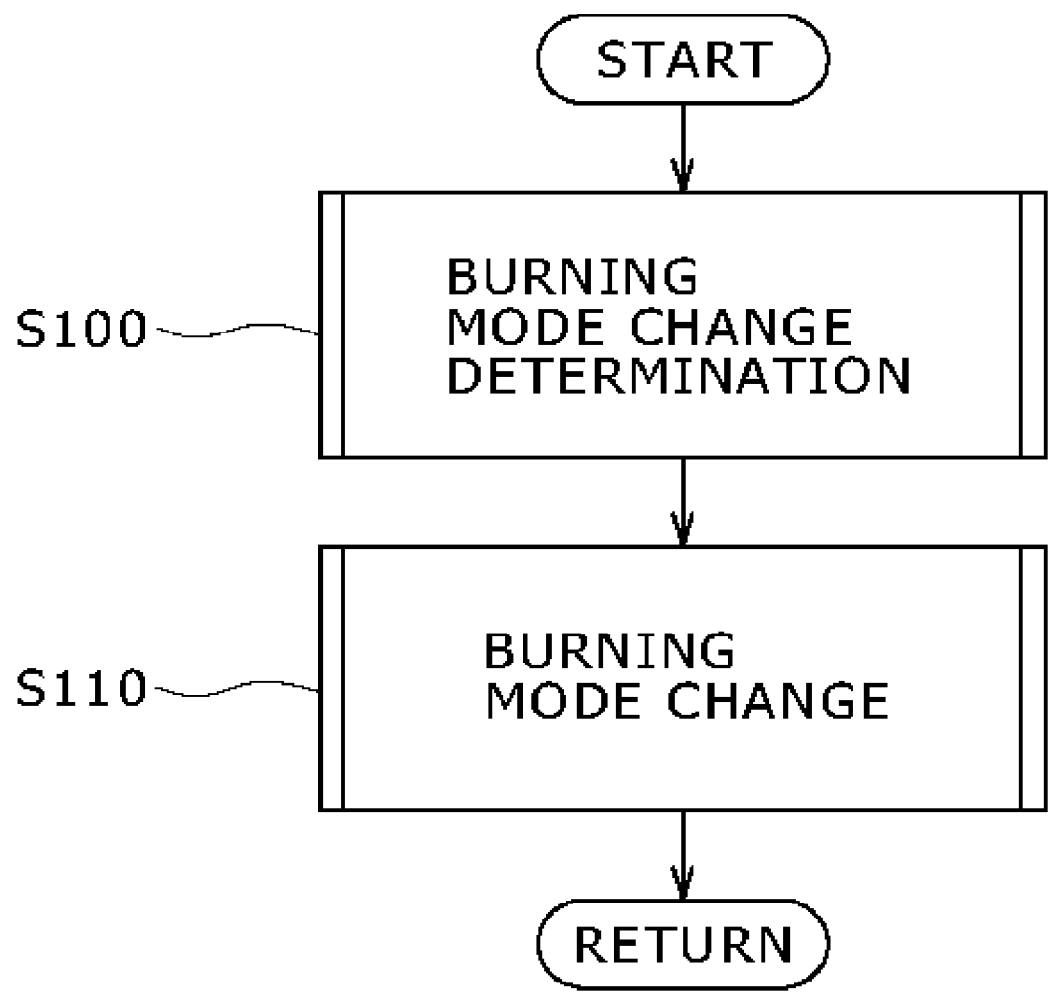
FIG. 8 is a flowchart providing an overview of burning mode change control in the embodiment 1.

FIG. 8 provides an overview of the mode change control. At Step S100, first, it is determined whether or not the burning mode should be changed from spark ignition burning mode to homogeneous charge compression ignition burning mode or from homogeneous charge compression ignition burning mode to spark ignition burning mode. Then ON (=1) or OFF (=0) is set in the burning mode change flag Fex. In the following description, variable t represents time. The details of Step S100 will be described later with reference to FIG. 9.

At Step S110 in FIG. 8, a manipulated variable suitable for the selected burning mode is set to operate the engine in burning mode corresponding to the burning mode change flag Fex(t) as the result of the processing of Step S100. Immediately after start of change from spark ignition burning mode to homogeneous charge compression ignition burning mode or immediately after start of change from homogeneous charge compression ignition burning mode to spark ignition burning mode, the following processing is carried out: a changing correction amount for the suppression of degradation in running performance is computed. The details of Step S110 will be described later with reference to FIG. 10.

Figure 9:
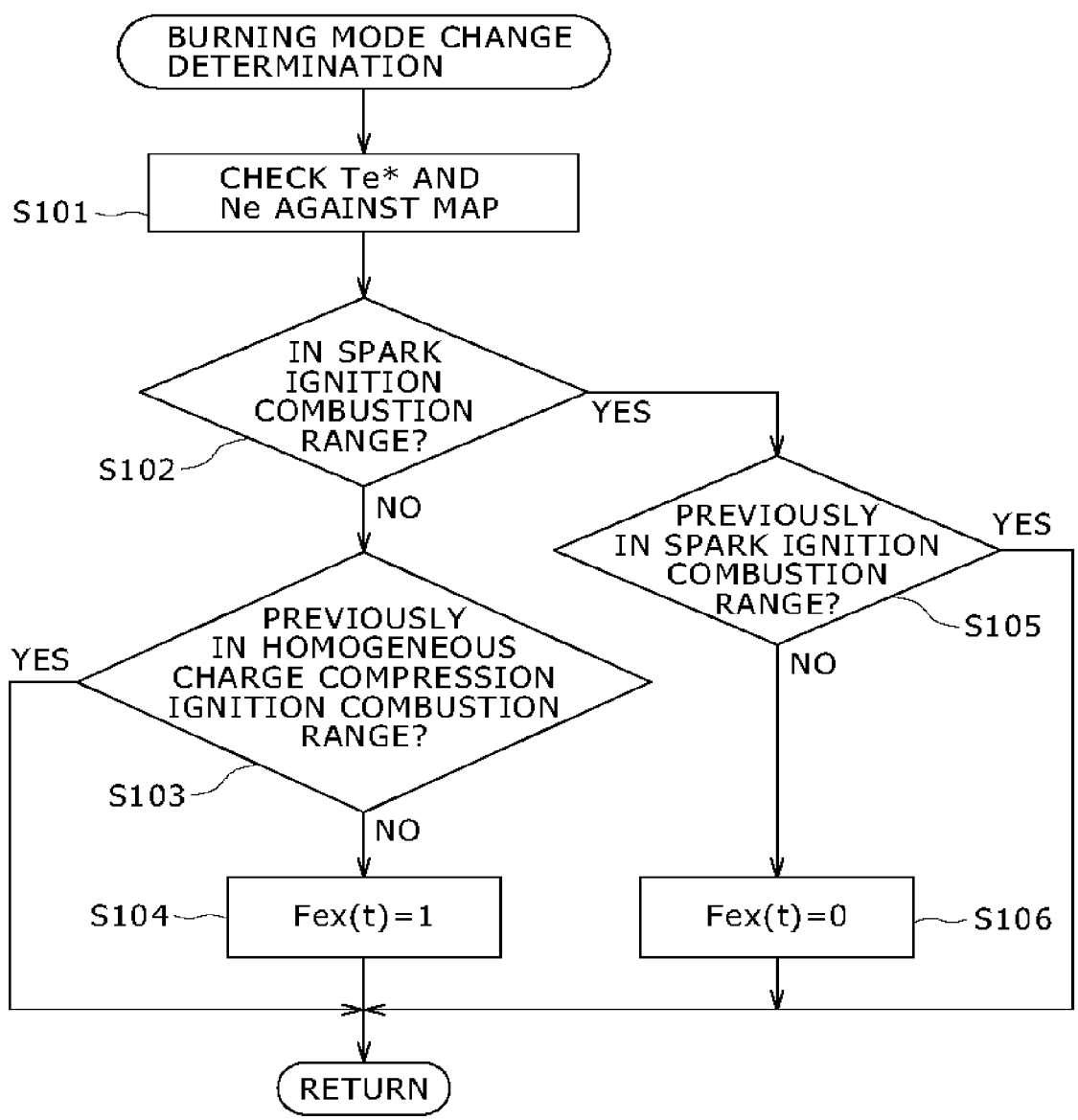
FIG. 9 is a flowchart illustrating the details of Step S100 (burning mode change determination processing) of FIG. 8.

FIG. 9 illustrates the details of Step S100 (burning mode change determination processing) in FIG. 8. At Step S101, the present request engine torque Te* and engine rotational speed Ne are checked against the map in FIG. 4. At Step S102, subsequently, it is determined whether or not the combustion is in the spark ignition combustion range SI. When it is determined that the combustion is not inn the spark ignition combustion range SI, that is, the combustion is in the homogeneous charge compression ignition combustion range HCCI, the flow proceeds to Step S103. At this step, it is determined whether or not the combustion was in the homogeneous charge compression ignition combustion range HCCI at the previous time of determination. When it is determined that the combustion was in the homogeneous charge compression ignition burning mode HCCI also at the previous time of determination, the flow returns to the first step. When it is determined that the combustion was in the spark ignition combustion range SI at the previous time of determination, the flow proceeds to Step 104 in order to change the burning mode from spark ignition burning mode to homogeneous charge compression ignition burning mode. At this step, ON (=1) is set in the burning mode change flag Fex(t) and the flow returns to the first step.

When it is determined at Step S102 that the combustion is in the spark ignition combustion range SI, the flow proceeds to Step S105 and it is determined whether or not the combustion was in the spark ignition combustion range SI at the previous time of determination. When it is determined that the combustion was in the spark ignition combustion range SI also at the previous time of determination, the flow returns to the first step. When it is determined that the combustion was not in the spark ignition combustion range SI, that is, the combustion was in the homogeneous charge compression ignition combustion range HCCI at the previous time of determination, the flow proceeds to Step S106. At this step, OFF (=0) is set in the burning mode change flag Fex(t) in order to change the burning mode from homogeneous charge compression ignition burning mode to spark ignition burning mode and the flow returns to the first step.

Figure 10:
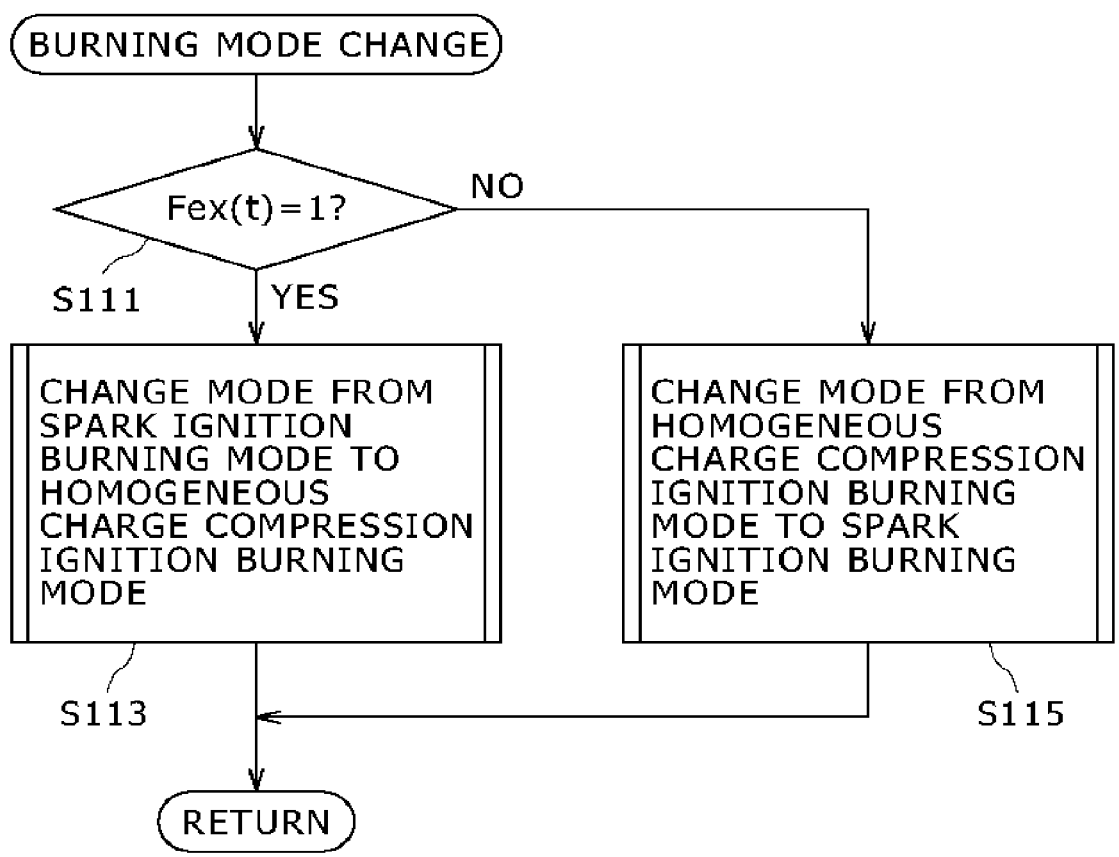
FIG. 10 is a flowchart illustrating the details of Step S110 (burning mode change processing) of FIG. 8.

FIG. 10 illustrates the details of Step S110 (burning mode change processing) in FIG. 8. At Step S111, it is determined whether or not ON (=1) was set in the burning mode change flag Fex(t) at Step S100. When it is determined that the burning mode change flag Fex(t)=1, the flow proceeds to Step S113. At this step, the processing of mode change from spark ignition burning mode to homogeneous charge compression ignition burning mode is carried out and the flow returns to the first step. When it is determined at Step S111 that the burning mode change flag Fex(t)=0, the flow proceeds to Step S115. At this step, the processing of mode change from homogeneous charge compression ignition burning mode to spark ignition burning mode and the flow returns to the first step.

Detailed description will be given to Step S113 (processing of mode change from spark ignition burning mode to homogeneous charge compression ignition burning mode) in FIG. 10 with reference to FIG. 11.

Figure 11:
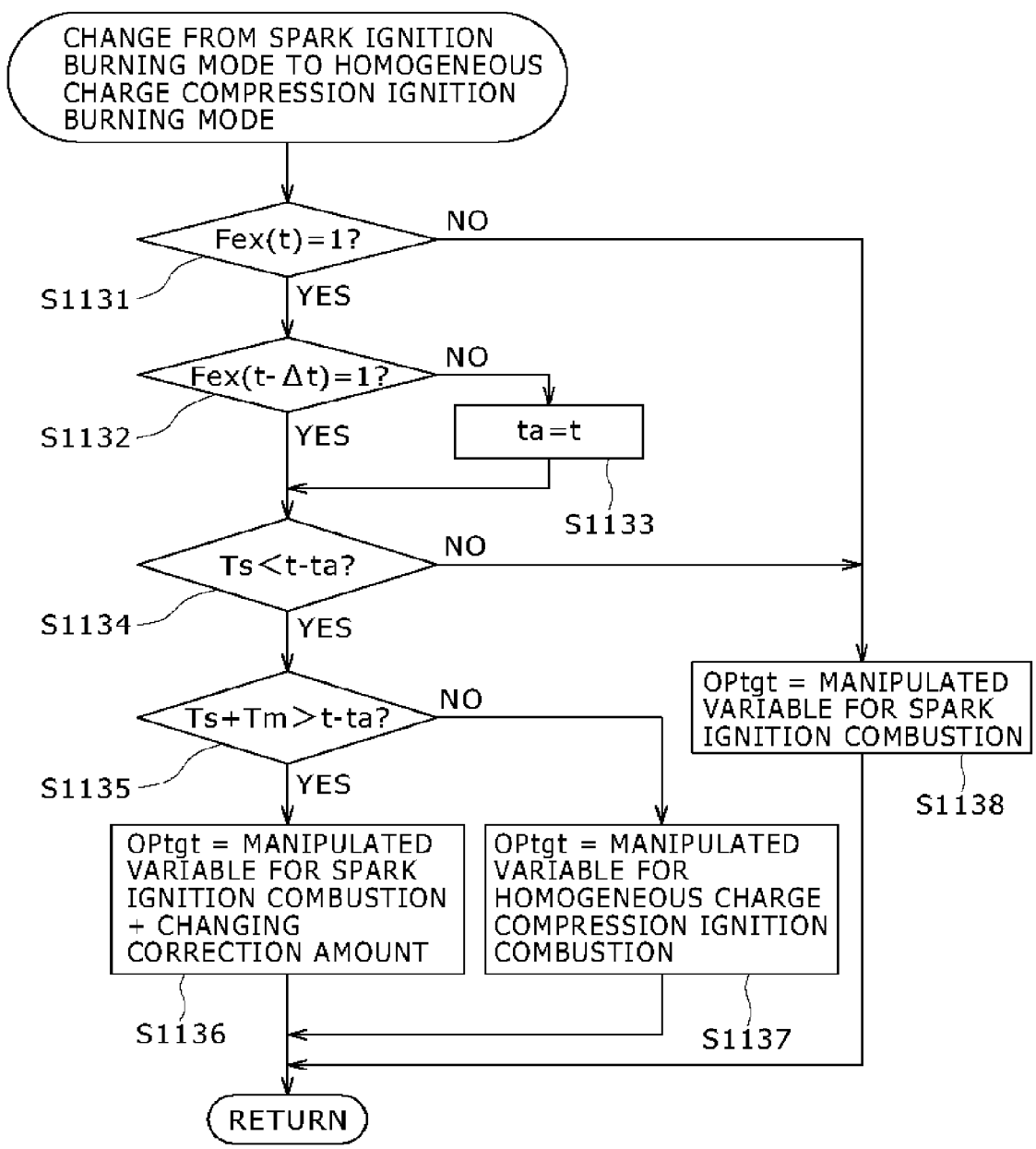
FIG. 11 is a flowchart illustrating the details of Step S113 (change from spark ignition burning mode to homogeneous charge compression ignition burning mode) of FIG. 10.

When it is determined at Step S1131 in FIG. 11 that ON (=1) was set in the burning mode change flag Fex(t) at Step S100, the flow proceeds to Step S1132. When it is determined that OFF (=0) was set in the burning mode change flag Fex(t), the flow proceeds to Step 1138. At Step S1132, it is determined whether the burning mode change flag Fex(t−Δt) at the time (time t−Δt) a time period Δt before time t is set to ON (=1) or OFF (=0). When it is determined that the burning mode change flag Fex(t−Δt) is set to ON (=1), it is determined that the state of Fex(t)=1 will continue and the flow proceeds to Step S1134. When the burning mode change flag Fex(t−Δt) is set to OFF (=0), it is determined that change from spark ignition burning node to homogeneous charge compression ignition burning mode should be started and the flow proceeds to Step S1133. At Step S1133, the present time t is set for change starting time ta and the flow proceeds to Step S1134.

At Step S1134, it is determined whether or not the time period t−ta after the start of mode change is longer than the predetermined time Ts. When t−ta is not longer than Ts, the flow proceeds to Step S1138. When t−ta is longer than Ts, the flow proceeds to Step S1135. At Step S1138, a manipulated variable for spark ignition combustion is set for the target manipulated variable OPtgt in order to carry out spark ignition burning mode and the flow returns to the first step. At Step S1135, it is determined whether or not the time period t−ta after the start of burning mode change is longer than the time Ts+Tm obtained by adding the predetermined time Ts and the predetermined time Tm. When the time period t−ta is shorter than the time Ts+Tm, the flow proceeds to Step S1136. When t−ta is longer than Ts+Tm, the flow proceeds to Step S1137.

At Step S1136, the following processing is carried out when the burning mode is changed from spark ignition burning mode to homogeneous charge compression ignition burning mode: the result obtained by adding a manipulated variable for spark ignition combustion and a changing correction amount is set for the target manipulated variable OPtgt during the period of time Ts+Tm during which the changing correction amount is added. Thereafter, the flow returns to the first step.

At Step S1137, the changing correction is terminated and the following processing is carried out in order to thereafter continue homogeneous charge compression ignition burning mode: a manipulated variable for homogeneous charge compression ignition combustion is set for the target manipulated variable OPtgt. Thereafter, the flow returns to the first step.

Detailed description will be given to Step S115 (processing of mode change from homogeneous charge compression ignition burning mode to spark ignition burning mode) in FIG. 10 with reference to FIG. 12.

Figure 12:
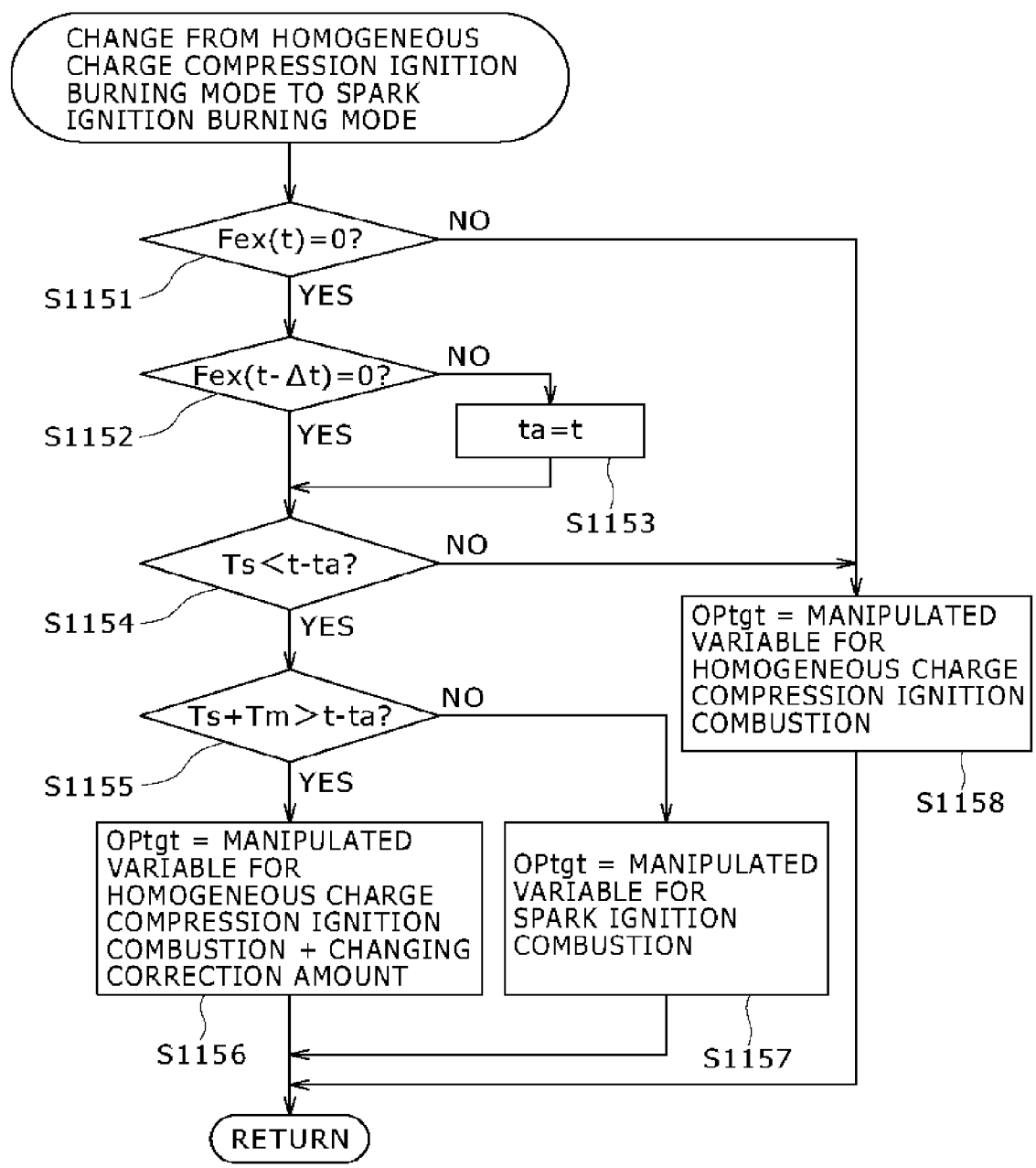
FIG. 12 is a flowchart illustrating the details of Step S115 (change from homogeneous charge compression ignition burning mode to spark ignition burning mode) of FIG. 10.

When it is determined that at Step S1151 in FIG. 12 that ON (=0) was set in the burning mode change flag Fex(t) at Step S100, the flow proceeds to Step S1152. When it is determined that OFF (=1) was set in the burning mode change flag Fex(t), the flow proceeds to Step 1158. At Step S1152, it is determined whether the burning mode change flag Fex(t−Δt) at the time (time t−Δt) a time period Δt before time t is set to ON (=0) or OFF (=1). When it is determined that the burning mode change flag Fex(t−Δt) is set to ON (=0), it is determined that the state of Fex (t)=0 will continue and the flow proceeds to Step S1154. When the burning mode change flag Fex(t−Δt) is set to OFF (=1), it is determined that burning mode change from homogeneous charge compression ignition burning mode to spark ignition burning mode should be started and the flow proceeds to Step S1153.

At Step S1153, the present time t is set for the change starting time ta and the flow proceeds to Step S1154. At Step S1154, it is determined whether or not the time period t−ta after the start of mode change is longer than the predetermined time Ts. When t−ta is not longer than Ts, the flow proceeds to Step S1158. When t−ta is longer than Ts, the flow proceeds to Step S1155. At Step S1158, a manipulated variable for spark ignition combustion is set for the target manipulated variable OPtgt in order to carry out homogeneous charge compression ignition burning mode and the flow returns to the first step.

At Step S1155, it is determined whether or not the time period t−ta after the start of burning mode change is longer than the time Ts+Tm obtained by adding the predetermined time Ts and the predetermined time Tm. When the time period t−ta is shorter than the time Ts+Tm, the flow proceeds to Step S1156. When t−ta is longer than Ts+Tm, the flow proceeds to Step S1157.

At Step S1156, the following processing is carried out when the burning mode is changed from homogeneous charge compression ignition burning mode to spark ignition burning mode: the result obtained by adding a manipulated variable for homogeneous charge compression ignition combustion and a changing correction amount is set for the target manipulated variable OPtgt during the period of time Ts+Tm during which the changing correction amount is added. Thereafter, the flow returns to the first step.

At Step S1157, the changing correction is terminated and the following processing is carried out in order to thereafter continue spark ignition burning mode: a manipulated variable for spark ignition combustion is set for the target manipulated variable OPtgt. Thereafter, the flow returns to the first step.

More detailed description will be given to the control of change from spark ignition burning mode to homogeneous charge compression ignition burning mode in this embodiment with reference to the time diagram in FIGS. 13A to 13H. In this embodiment, the valve opening period of the intake valve 5a is used as a changing correction amount.

In FIG. 13A, the vertical axis indicates whether the burning mode change flag Fex is set to ON (=1) or OFF (=0). In FIG. 13B, the vertical axis indicates whether the flag Fex2 obtained as the result of subjecting the burning mode change flag Fex to timer processing is set to ON (=1) or OFF (=0). In FIG. 13C, the vertical axis indicates whether the correction amount change determination flag Fho is set to ON (=1) or OFF (=0). FIG. 13D indicates the opening θTH of the throttle valve 2 (throttle opening). The throttle opening θTH is larger as it goes upward in the drawing. FIG. 13E indicates the closing timing EVC of the exhaust valve 5b. The exhaust valve closing timing EVC is advanced as it goes upward in the drawing. FIG. 13F indicates the opening timing IVO of the intake valve 5a. The intake valve opening timing IVO is advanced as it goes upward in the drawing. FIG. 13G indicates the valve opening period IVevent of the intake valve 5a. The valve opening period IVevent of the intake valve 5a is lengthened as it goes upward in the drawing. FIG. 13H indicates the state State of the interior of the combustion chamber 7 corresponding to points A, B, C, and D in FIG. 7.

In FIGS. 13A to 13H, time ta represents the time when mode change from spark ignition burning mode to homogeneous charge compression ignition burning mode is started. Time To represents the time period from when the setting of the burning mode change flag Fex is changed to when the setting of Fex2 is changed. Time Ts represents the time period from when the setting of the burning mode change flag Fex is changed to when the setting of the flag Fho is changed (till time tb). Time Tm represents the time period from when the flag Fho is set to ON (=1) at time tb to time tc, that is, the time period during which a changing correction amount is added to the target manipulated variable.

Before time ta, the engine has its engine parameters set for spark ignition burning mode and is in the state corresponding to point A in FIG. 7. Thereafter, it is determined that the burning mode can be changed from spark ignition burning mode to homogeneous charge compression ignition burning mode. During the period of the predetermined time To, the combustion state is shifted to the state corresponding to point B in which the internal EGR rate RI-EGR is high. After predetermined time ta+To (or ta+Ts), that is, after time tb, subsequently, the combustion state transitions to the state corresponding to point C in the homogeneous charge compression ignition combustion range HCCI. After time ta+To+Tm (or ta+Ts+Tm), that is, after time tc, subsequently, the combustion state transitions to the state corresponding to point D and the burning mode is changed to homogeneous charge compression ignition burning mode.

In FIG. 13G indicating the valve opening period of the intake valve 5a, the broken line and the solid line respectively indicate the following between time tb=time ta+To (or ta+Ts) and time tc=time ta+To+Tm (or ta+Ts+Tm): the broken line indicates a target manipulated variable obtained when the above-mentioned changing correction amount is not added; and the solid line indicates a manipulated variable obtained when the changing correction amount is added to a manipulated variable for homogeneous charge compression ignition combustion in this embodiment (in this case, the valve opening period is shortened).

The predetermined times To, Ts, and Tm may be changed according to the engine rotational speed Ne. For example, when the engine rotational speed is low, these times are made longer in correspondence with the response time of the intake valve 5a and the exhaust valve 5b; or when the engine rotational speed is high, these times are set to a short time. However, the invention is not limited to the foregoing and the above predetermined times may be determined according to the response time of the behavior of gas in the combustion chamber obtained when a manipulated variable is operated.

Description will be given to the action and effect obtained when the manipulated variable changing correction is carried out as in this embodiment based on comparison with a case where the manipulated variable changing correction is not carried out.

First, description will be given to a case where the above-mentioned manipulated variable changing correction is not carried out. In this case, the following processing is carried out when it is determined at time ta that homogeneous charge compression ignition combustion is feasible as indicated by FIG. 13A: the burning mode change flag Fex is set to ON (=1) and in preparation for burning mode change, the exhaust valve closing timing EVC is advanced (FIG. 13E) and the intake valve opening timing IVO is delayed (FIG. 13F). Since non-throttle spark ignition combustion is carried out during this period, the throttle opening θTH is maximized (FIG. 13D) and the intake valve opening period IVevent is made equal to that before time ta (FIG. 13G). As the result of this operation being performed, the combustion state shifts from point A to point B in FIG. 7. Fex2 is set to ON (=1) from time tb=time ta+To (or ta+Ts) and as a result, the following takes place: the exhaust valve closing timing EVC is further advanced (FIG. 13E); the intake valve opening timing IVO is further delayed (FIG. 13F); and the intake valve opening period IVevent is shortened (FIG. 13G). Then a manipulated variable is so set that homogeneous charge compression ignition burning mode corresponding to point D in FIG. 7 is carried out.

Description will be given to a case where the manipulated variable changing correction in this embodiment is carried out.

In this case, the following processing is carried out when it is determined at time ta that homogeneous charge compression ignition combustion is feasible as indicated by FIG. 13A: ON (=1) is set in the burning mode change flag Fex and burning mode change from spark ignition burning mode to homogeneous charge compression ignition burning mode is started. As indicated by FIG. 13B, Fex2 is set to ON (=1) the predetermined time To after change in Fex. As indicated by FIG. 13C, the flag Fho is set to ON (=1) during the period from time tb the predetermined time Ts later to time tc the predetermined time Tm later based on the change in Fex.

As indicated by FIG. 13D, further, the throttle opening θTH is kept wide both in spark ignition burning mode and in homogeneous charge compression ignition burning mode.

As indicated by FIG. 13E, further, the exhaust valve closing timing EVC is advanced at time ta to achieve the state corresponding to point B in FIG. 7 and is further advanced at time tb=time ta+To (or ta+Ts) to establish the state corresponding to point C (or point D) in FIG. 7.

As indicated by FIG. 13F, the intake valve opening timing IVO is delayed at time ta to achieve the state corresponding to point B in FIG. 7 and is further delayed at time tb=time ta+To (or ta+Ts) to establish the state corresponding to point C (or point D) in FIG. 7.

As indicated by FIG. 13G, the intake valve opening period IVevent is kept constant till time tb=time ta+To (or ta+Ts). During the period from time tb to time tc, a correction amount is added to the target manipulated variable at point D in FIG. 7 to make the valve opening period shorter than the target manipulated variable at point D in FIG. 7. After time tc, IVevent is changed to the valve opening period for homogeneous charge compression ignition burning mode at point D in FIG. 7.

The manipulated variable for spark ignition combustion, manipulated variable for homogeneous charge compression ignition combustion, changing correction amount, predetermined time To, predetermined time Ts, and predetermined time Tm are set values determined beforehand through testing or simulation. They differ according to the operating state of the engine 30. They may be set based on the result of output of sensors (for example, cylinder pressure sensor, knock sensor, air-fuel ratio sensor, and the like) for detecting the combustion state in the combustion chamber 7.

The changing correction amount for the intake valve opening period IVevent may be set based on the result of output of the following sensors: an intake air temperature sensor for detecting the temperature of air sucked into the combustion chamber 7; a humidity sensor for detecting the humidity of air; an atmospheric pressure sensor for detecting atmospheric pressure; and the like.

Further, the value of changing correction amount may be set by the result of learning an amount by which correction is carried out according to change in the external environment in spark ignition burning mode and in homogeneous charge compression ignition burning mode.

Description will be given to the behavior of each part observed when the control of burning mode change from spark ignition burning mode to homogeneous charge compression ignition burning mode is carried out with reference to the time diagram in FIGS. 14A to 14F.

In FIG. 14A, the vertical axis indicates the amount of internal EGR Qegr. The amount of internal EGR Qegr is increased as it goes upward in the drawing. In FIG. 14B, the vertical axis indicates intake air quantity Qair. The intake air quantity Qair is increased as it goes upward in the drawing. In FIG. 14C, the vertical axis indicates air-fuel ratio A/F. The air-fuel ratio A/F becomes leaner as it goes upward in the drawing. In FIG. 14D, the vertical axis indicates engine torque Te. The engine torque Te is increased as it goes upward in the drawing. In FIG. 14E, the vertical axis indicates engine rotational speed Ne. The engine rotational speed Ne is increased as it goes upward in the drawing. FIG. 14F indicates the state State of the interior of the combustion chamber 7 corresponding to points A, B, C, and D in FIG. 7.

In FIGS. 14A to 14F, the solid lines indicate a case where the above-mentioned manipulated variable changing correction is carried out in transition for change from spark ignition burning mode to homogeneous charge compression ignition burning mode. The broken lines indicate a case where the changing correction is not carried out.

First, description will be given to a case where the above-mentioned manipulated variable changing correction is not carried out.

After preparation for manipulated variables from time ta, each manipulated variable is changed to a set value for implementing homogeneous charge compression ignition burning mode at time tb=time ta+To (or ta+Ts). Consequently, the amount of internal EGR Qegr is increased (FIG. 14A) and the air quantity Qair is increased (FIG. 14B). As the result of this operation, the burning mode transitions from spark ignition burning mode to homogeneous charge compression ignition burning mode.

During this period Tm from time tb to time tc, the opening/closing timing of the intake valve 5a and the opening/closing timing of the exhaust valve 5b are largely changed to vary the amount of internal EGR Qegr and the air quantity Qair. In conjunction with this, the intake air quantity Qair is temporarily increased or decreased or fluctuates as indicated by FIG. 14B mainly because of the following: the cylinder pressure due to the amount of internal EGR Qegr in the cylinder or the opening/closing timing of the intake valve 5a in response to piston operation varies. As a result, the intake air quantity Qair may be different from a desired intake air quantity Qair. Because of this fluctuation in intake air quantity Qair, the air-fuel ratio A/F becomes lean (FIG. 14C) and the combustion is brought into the combustion instability range CIS in FIG. 7. This causes misfire and can pose such a problem as fluctuation in engine torque Te (FIG. 14D) and fluctuation in engine rotational speed (FIG. 14E).

Fluctuation in intake air quantity Qair is also caused by difference in response time of the opening/closing timing of the intake valve 5a or the opening/closing timing of the exhaust valve 5b.

Description will be given to a case where the above-mentioned manipulated variable changing correction is carried out.

In this embodiment, the valve opening period of the intake valve 5a is corrected during the period from time tb to time tc during which fluctuation in intake air quantity Qair occurs. The valve opening period is thereby made shorter than a set value for homogeneous charge compression ignition burning mode to reduce the intake air quantity Qair (FIG. 14B). This suppresses the air-fuel ratio A/F from temporarily becoming lean (FIG. 14C) in transition from point B to point D in FIG. 7. Reduction in engine torque Te is suppressed (FIG. 14D) and fluctuation in engine rotational speed Ne is suppressed (FIG. 14E) by causing the combustion to transition to point C in this state. As a result, smooth burning mode change can be achieved.

During burning mode change from spark ignition burning mode to homogeneous charge compression ignition burning mode, the following can take place though not shown in the drawing: during the period from time tb to time tc, the setting of the burning mode change flag may be changed from ON (=1) to OFF (=0) by a driver's request or the like. In this case, it is determined that change to spark ignition burning node is required and a manipulated variable for spark ignition combustion is set as the target manipulated variable in order to implement spark ignition combustion.

Description will be given to the behavior of each part observed when the control of change from homogeneous charge compression ignition burning mode to spark ignition burning mode is carried out with reference to the time diagram in FIGS. 15A to 15H.

In FIG. 15A, the vertical axis indicates whether the burning mode change flag Fex is set to ON (=1) or OFF (=0). In FIG. 15B, the vertical axis indicates whether the flag Fex2 obtained as the result of subjecting the burning mode change flag Fex to timer processing is set to ON (=1) or OFF (=0). In FIG. 15C, the vertical axis indicates whether the flag Fho is set to ON (=1) or OFF (=0). FIG. 15D indicates throttle opening θTH. The throttle opening θTH is larger as it goes upward in the drawing. FIG. 15E indicates exhaust valve closing timing EVC. The exhaust valve closing timing EVC is advanced as it goes upward in the drawing. FIG. 15F indicates intake valve opening timing IVO. The intake valve opening timing is advanced as it goes upward in the drawing. FIG. 15G indicates intake valve opening period IVevent. The intake valve opening period IVevent is lengthened as it goes upward in the drawing. FIG. 15H indicates the state State of the interior of the combustion chamber corresponding to points A, B, C, and D in FIG. 7.

Time ta represents the time when mode change from homogeneous charge compression ignition burning mode to spark ignition burning mode is started. Time Tm represents the time period after the flag Fho is set to OFF (=0) during which a changing correction amount is added to the target manipulated variable.

Before time ta, the engine parameters are set for homogeneous charge compression ignition burning mode and the engine is being operated in the state corresponding to point D in FIG. 7. Thereafter, it is determined that the burning mode can be changed from homogeneous charge compression ignition burning mode to spark ignition burning mode. During the period of time Tm fro time ta to time tb, the air-fuel ratio A/F is shifted to approximately 14.7 (stoichiometric air fuel ratio) in order to obtain the state corresponding to point C in FIG. 7. Thereafter, the combustion is caused to transition to the state corresponding to point B in FIG. 7 and then caused to transition to the state corresponding to point A in FIG. 7.

In FIG. 15G, the broken line and the solid line respectively indicate the following between time ta and time tb: the broken line indicates a target manipulated variable obtained when a changing correction amount is not added; and the solid line indicates a manipulated variable obtained when a changing correction amount is added.

In this case, Time To represents the time period from when the setting of the burning mode change flag Fex is changed to when the setting of Fex2 is changed, and Time Ts represents the time period from when the setting of the flag Fex is changed to when the setting of the flag Fho is changed; however, in the case of FIGS. 15A to 15G, time To and time Ts are 0 (zero) in case of change from homogeneous charge compression ignition burning mode to spark ignition burning mode, unlike change from spark ignition burning mode to homogeneous charge compression ignition burning mode illustrated in FIGS. 13A to 13H.

First, description will be given to a case where the above-mentioned manipulated variable changing correction is not carried out.

When it is determined at time ta that spark ignition combustion is feasible, the burning mode change flag Fex is set to OFF (=0) (FIG. 15A) and at the same time, the flag Fex2 is set to OFF (=0) (FIG. 15B). The flag Fho for changing the changing correction amount is set to ON (=1) at time ta and kept ON (=1) to correct the target manipulated variable during the period of time Tm and is thereafter set to OFF (=0) (FIG. 15C). The throttle opening θTH is kept in the fully open condition both in homogeneous charge compression ignition burning mode and in spark ignition burning mode. At time tb when time Tm has passed, the exhaust valve closing timing EVC is delayed in order to establish spark ignition burning mode (state corresponding to point B in FIG. 7) in which the internal EGR rate is high. Thereafter, the exhaust valve closing timing EVC is further delayed to establish the state corresponding to point A in FIG. 7 (FIG. 15E). Similarly with the exhaust valve closing timing, the intake valve opening timing IVO is advanced at time tb and is thereafter further advanced (FIG. 15F). The intake valve opening period IVevent is lengthened at time tb (FIG. 15G).

Description will be given to a case where the above-mentioned manipulated variable changing correction is carried out.

When it is determined at time ta that homogeneous charge compression ignition combustion is feasible, as indicated by FIG. 15A, OFF (=0) is set in the burning mode change flag Fex. Burning mode change from homogeneous charge compression ignition burning mode to spark ignition burning mode is started. Immediately after change in Fex, as indicated by FIG. 15B, Fex2 is set to OFF (=0). As indicated by FIG. 15C, the flag Fho is set to ON (=1) till time tb when the predetermined time Tm has passed after time ta based on the change in the flag Fex.

As indicated by FIG. 15D, the throttle opening θTH is kept in the fully open condition both in homogeneous charge compression ignition burning mode and in spark ignition burning mode.

As indicated by FIG. 15E, the exhaust valve closing timing EVC is delayed at time tb to cause the combustion to transition from the state corresponding to point C in FIG. 7 to the state corresponding to point B. Thereafter, the exhaust valve closing timing EVC is further delayed to cause the combustion to transition to the state corresponding to point A in FIG. 7.

As indicated by FIG. 15F, the intake valve opening timing IVO is advanced at time tb to cause the combustion to transition from the state corresponding to point C in FIG. 7 to the state corresponding to point B. The intake valve opening timing IVO is further advanced to cause the combustion to transition from the state corresponding to point B in FIG. 7 to the state corresponding to point A.

With respect to the intake valve opening period IVevent, the processing indicated by FIG. 15G is carried out. That is, during the period from time ta to time tb, a correction amount is added to the target manipulated variable for homogeneous charge compression ignition burning mode. Thus, the intake valve opening period IVevent is shortened to cause the combustion to transition to the state corresponding to point C in FIG. 7 and is thereafter lengthened at time tb to operate the engine in spark ignition burning mode.

Description will be given to the behavior of each part observed when the control of burning mode change from homogeneous charge compression ignition burning mode to spark ignition burning mode with reference to the time diagram in FIGS. 16A to 16F.

In FIG. 16A, the vertical axis indicates the amount of internal EGR Qegr. The amount of internal EGR Qegr is increased as it goes upward in the drawing. In FIG. 16B, the vertical axis indicates intake air quantity Qair. The intake air quantity Qair is increased as it goes upward in the drawing. In FIG. 16C, the vertical axis indicates air-fuel ratio A/F. The air-fuel ratio A/F becomes leaner as it goes upward in the drawing. In FIG. 16D, the vertical axis indicates engine torque Te. The engine torque Te is increased as it goes upward in the drawing. In FIG. 16E, the vertical axis indicates engine rotational speed Ne. The engine rotational speed Ne is increased as it goes upward in the drawing. FIG. 16F indicates the state State of the interior of the combustion chamber corresponding to points A, B, C, and D in FIG. 7.

In FIGS. 16A to 16F, the solid lines indicate a case where the above-mentioned manipulated variable changing correction is carried out in transition from homogeneous charge compression ignition burning mode to spark ignition burning mode. The broken lines indicate a case where the changing correction is not carried out.

First, description will be given to a case where the above-mentioned manipulated variable changing correction is not carried out.

At time tb=time ta+Tm, each manipulated variable is changed to a set value for implementing spark ignition burning mode. Consequently, the amount of internal EGR Qegr is reduced (FIG. 16A) and the air quantity Qair is increased (FIG. 16B). As the result of this operation, the burning mode transitions from homogeneous charge compression ignition burning mode to spark ignition burning mode. Thereafter, the amount of internal EGR is reduced in spark ignition burning mode and the combustion is thereby caused to transition to the state corresponding to point A in FIG. 7.

Since the intake valve opening period IVevent is not corrected during the period from time ta to time tb, at this time, the intake air quantity Qair is kept in the same state as before time ta. Unlike the target changing state, the intake air quantity Qair is large and the air-fuel ratio A/F is lean. After time tb, the opening/closing timing of the intake valve and the opening/closing timing of the exhaust valve are largely varied. Since the intake air quantity Qair is large, however, the following may take place halfway through the mode change: the cylinder pressure due to the amount of internal EGR Qegr in the combustion chamber or the opening/closing timing of the intake valve in response to piston operation varies; and as a result, the intake air quantity Qair may be temporarily increased as indicated by FIG. 16B. Because of this temporary increase in intake air quantity Qair, the air-fuel ratio A/F becomes lean (FIG. 16C) and the combustion is brought into the combustion instability range CIS in FIG. 7. This may cause such a problem as misfire, fluctuation in engine torque Te (FIG. 16D), and fluctuation in engine rotational speed (FIG. 16E).

Description will be given to a case where the above-mentioned manipulated variable changing correction is carried out.

During the period from time ta to time tb, the intake valve opening period IVevent is corrected in order to cause the combustion to transition to the state corresponding to point C in FIG. 7. The intake valve opening period IVevent is corrected so that the air-fuel ratio A/F is approximately 14.7 (stoichiometric air fuel ratio). The intake air quantity Qair is thereby reduced prior to burning mode change at time ta+Tm and this makes it possible to suppress temporary increase in intake air quantity Qair due to change of each manipulated variable at time ta+Tm (FIG. 16B). As a result, the air-fuel ratio A/F is suppressed from temporarily becoming lean after time tb (FIG. 16C). This makes it possible to suppress fluctuation in engine torque Te (FIG. 16D) and suppress fluctuation in engine rotational speed Ne (FIG. 16E) and to achieve smooth burning mode change.

During burning mode change from homogeneous charge compression ignition burning mode to spark ignition burning mode, the following can take place though not shown in the drawing: during the period from time ta to time tb, the setting of the burning mode change flag may be changed from OFF (=1) to ON (=0) by a driver's request or the like. In this case, it is determined that change to homogeneous charge compression ignition combustion has been requested and a manipulated variable for homogeneous charge compression ignition combustion is set as the target manipulated variable in order to implement homogeneous charge compression ignition combustion.

In this embodiment, the following measure is taken with respect to the intake valve opening period IVevent: a set value for homogeneous charge compression ignition burning mode is made smaller than a set value for spark ignition burning mode. However, the invention is not limited to this. The intake valve opening period IVevent is set based on the engine torque Te and the engine rotational speed Ne and the relation between the above set values may be reversed or they may be equal to each other. Also in these cases, however, a changing correction amount is similarly added in such a direction that the intake valve opening period IVevent is shortened.

Description will be given to the period from time tb to time tc (time ta+Ts to time ta+Ts+Tm) with reference to FIGS. 17A and 17B to FIGS. 21A and 21B. This period is a period during which a changing correction amount is added when the burning mode is changed from spark ignition burning mode to homogeneous charge compression ignition burning mode.

Representative triggers for change from spark ignition burning mode to homogeneous charge compression ignition burning mode include request engine torque Te* and engine rotational speed Ne. When the engine rotational speed Ne and the request engine torque Te* requested by a driver enter the homogeneous charge compression ignition combustion range HCCI illustrated in FIG. 4 during operation in spark ignition burning mode, the following is carried out: the burning mode is changed from spark ignition burning mode to homogeneous charge compression ignition burning mode. At this time, a method for determining a request engine torque Te* indicating the upper limit of the homogeneous charge compression ignition combustion range HCCI at a given engine rotational speed Ne is important.

FIGS. 17A and 17B show a time diagram illustrating request engine torque Te* and the burning mode change flag Fex. In FIG. 17A, the vertical axis indicates request engine torque Te*. The request engine torque Te* is increased as it goes upward in the drawing. In FIG. 17B, the vertical axis indicates whether the burning mode change flag Fex is set to ON (=1) or OFF (=0). In FIG. 17A, sTe* indicates a request engine torque Te* indicating the upper limit of the homogeneous charge compression ignition combustion range HCCI in FIG. 4 in the relevant operating state.

When the request engine torque Te* requested by the driver is reduced and becomes equal to or lower than the predetermined value sTe* at time tt1, the following processing is carried out: the setting of the burning mode change flag Fex is changed from OFF (=0) to ON (=1) in order to change the burning mode from spark ignition burning mode to homogeneous charge compression ignition burning mode.

FIGS. 18A and 18B show a time diagram illustrating the following plotted when the burning mode is changed from homogeneous charge compression ignition burning mode to spark ignition burning mode according to change in request engine torque Te*: the request engine torque Te* and the burning mode change flag Fex. In FIG. 18A, the vertical axis indicates request engine torque Te*. The request engine torque Te* is increased as it goes upward in the drawing. In FIG. 18B, the vertical axis indicates whether the burning mode change flag Fex is set to ON (=1) or OFF (=0). As in FIGS. 17A and 17B, sTe* indicates a request engine torque Te* indicating the upper limit of the homogeneous charge compression ignition combustion range HCCI illustrated in FIG. 4 at a given engine rotational speed Ne in the relevant operating state.

When the request engine torque Te* not less than the upper-limit engine torque sTe* is increased during operation in homogeneous charge compression ignition burning mode and becomes equal to or higher than the upper-limit engine torque sTe* at time tt2, the following processing is carried out: the setting of the burning mode change flag Fex is changed from ON (=1) to OFF (=0) in order to change the burning mode from homogeneous charge compression ignition burning mode to spark ignition burning mode.

In mode change from spark ignition burning mode to homogeneous charge compression ignition burning mode, the following measure is taken based on change in burning mode change flag Fex illustrated in FIGS. 17A and 17B: during the period from time tb when the time Ts has passed to when the time Tm has passed, a period for correcting the target manipulated variable with a changing correction amount is provided.

Therefore, the following measure is taken in change from spark ignition burning mode to homogeneous charge compression ignition burning mode: the correction of a changing correction amount is started at the same time as or after the request engine torque Te* becomes equal to or higher than the predetermined engine torque sTe*.

The following measure is taken in change from homogeneous charge compression ignition burning mode to spark ignition burning mode: a period during which a target manipulated variable is corrected with a changing correction amount is provided during the period from time ta to when time Tm has passed based on change in burning mode change flag Fex illustrated in FIGS. 18A and 18B.

Therefore, the following measure is taken in change from homogeneous charge compression ignition burning mode to spark ignition burning mode: the correction of a changing correction amount is started at the same time as or after the request engine torque Te* becomes equal to or lower than the predetermined engine torque sTe*.

Description will be given to a method for determining the above-mentioned predetermined engine torque sTe* (the upper limit value of the homogeneous charge compression ignition combustion range HCCI in FIG. 4) with reference to FIGS. 19A to 19C.

In each of FIG. 19A to 19C, the horizontal axis indicates request engine torque Te*. The request engine torque Te* is increased as it goes to the right in the drawing. In FIG. 19A, the vertical axis indicates the rate of pressure rise dPimax in the combustion chamber 7. The rate of pressure rise dPimax is increased as it goes upward in the drawing. In FIG. 19B, the vertical axis indicates air-fuel ratio A/F. The air-fuel ratio A/F becomes leaner as it goes upward in the drawing. In FIG. 19C, the vertical axis indicates the rate of cycle-by-cycle variation of combustion cPi. The rate of cycle-by-cycle variation of combustion cPi is increased as it goes upward in the drawing. sdPimax in FIG. 19A represents a permissible value of the rate of pressure rise dPimax. sA/F in FIG. 19B represents a permissible value of air-fuel ratio A/F. scPi in FIG. 19C represents a permissible value of the rate of cycle-by-cycle variation of combustion cPi.

As indicated by FIG. 19A, the maximum value dPimax of the rate of pressure rise is increased with increase in request engine torque Te*. The engine torque sTe* may be a request engine torque at which the maximum value dPimax of the rate of pressure rise becomes equal to the predetermined value sdPimax.

As indicated by FIG. 19B, the air-fuel ratio A/F becomes richer with increase in request engine torque Te*. The engine torque sTe* may be a request engine torque sTe2 with which the air-fuel ratio A/F becomes equal to the predetermined air-fuel ratio sA/F.

As indicated by FIG. 19C, the rate of cycle-by-cycle variation of combustion cPi is reduced with increase in request engine torque Te*. The engine torque sTe* may be determined by a request engine torque sTe3 with which the rate of cycle-by-cycle variation of combustion cPi becomes equal to the predetermined rate of cycle-by-cycle variation of combustion scPi.

The starting time of the above-mentioned period during which the changing correction amount is added is not limited to that based on request engine torque Te*. It may be based on a signal from a sensor for detecting the temperature and the humidity of air sucked into the combustion chamber 7 or atmospheric pressure. It may be determined based on an output signal from a device or a sensor for detecting information on the surroundings of the vehicle, such as following distance and map information, in the vehicle equipped with the controller 40 for engine 30 in this embodiment. It may be determined based on an output signal from a control device other than the controller 40 for engine 30 in this embodiment.

Description will be given to the termination time of a period during which a changing correction amount is added to the target manipulated variable with reference to the time diagrams in FIGS. 20A and 20B and FIGS. 21A and 21B.

FIGS. 20A and 20B indicate the maximum value dPimax of the rate of pressure rise and the amount of internal EGR Qegr observed when the burning mode is changed from spark ignition burning mode to homogeneous charge compression ignition burning mode.

In FIG. 20A, the vertical axis indicates the maximum value dPimax of the rate of pressure rise. The maximum value dPimax of the rate of pressure rise is increased as it goes upward in the drawing. In FIG. 20B, the vertical axis indicates the amount of internal EGR Qegr. The amount of internal EGR Qegr is increased as it goes upward in the drawing. sdPimax2 in FIG. 20A represents a predetermined value of the maximum value dPimax of the rate of pressure rise. sQegr1 in FIG. 20B represents a predetermined value of the amount of internal EGR Qegr.

As indicated by FIG. 20A, the following takes place when the burning mode is changed to homogeneous charge compression ignition burning mode: the maximum value dPimax of the rate of pressure rise is increased and then the combustion state is stabilized and dPimax is reduced. It becomes equal to or lower than the predetermined value sdPimax2 at time ttx. At this time, it may be determined that the burning mode change has been completed and the addition of a changing correction amount may be terminated.

As indicated by FIG. 20B, the following takes place when the burning mode is changed to homogeneous charge compression ignition burning mode: the amount of internal EGR Qegr is increased and then the amount of internal EGR Qegr becomes equal to or larger than the predetermined value sQegr1 at time ttw. At this timer it may be determined that the burning mode change has been completed and the addition of a changing correction amount may be terminated.

FIGS. 21A and 21B indicate the maximum value dPimax of the rate of pressure rise and the amount of internal EGR Qegr observed when the burning mode is changed from homogeneous charge compression ignition burning mode to spark ignition burning mode.

In FIG. 21A, the vertical axis indicates the maximum value dPimax of the rate of pressure rise. The maximum value dPimax of the rate of pressure rise is increased as it goes upward in the drawing. In FIG. 21B, the vertical axis indicates the amount of internal EGR Qegr. The amount of internal EGR Qegr is increased as it goes upward in the drawing. sdPimax3 in FIG. 21A represents a predetermined value of the maximum value dPimax of the rate of pressure rise. sQegr2 in FIG. 21B represents a predetermined value of the amount of internal EGR Qegr.

As indicated by FIG. 21A, the following takes place when the burning mode is changed to spark ignition burning mode: the maximum value dPimax of the rate of pressure rise is reduced and becomes equal to or lower than the predetermined value sdPimax3 at time ttz. At this time, it may be determined that the burning mode change has been completed and the addition of a changing correction amount may be terminated.

As indicated by FIG. 21B, the following takes place when the burning mode is changed to spark ignition burning mode: the amount of internal EGR Qegr is reduced and then the amount of internal EGR Qegr becomes equal to or smaller than the predetermined value sQegr2 at time tty. At this time, it may be determined that the burning mode change has been completed and the addition of a changing correction amount may be terminated.

That is, the termination time of a period during which a changing correction amount is added to the target manipulated variable is set to a time equal to or slightly earlier than the following time: the time when the burning mode is changed from spark ignition burning mode to homogeneous charge compression ignition burning mode (homogeneous charge compression ignition combustion starting time); or the time when the burning mode is changed from homogeneous charge compression ignition burning mode to spark ignition burning mode (spark ignition combustion starting time).

What should determine the termination time of burning mode change need not be the maximum value dPimax of the rate of pressure rise or the amount of internal EGR Qegr as indicated in FIGS. 20A and 20B or FIGS. 21A and 21B. It may be determined based on the result of detection of any other signal related to burning mode, such as cylinder pressure, rate of cycle-by-cycle variation of combustion, air quantity, and air-fuel ratio.

As described up to this point, this embodiment adopts the following method to suppress fluctuation in air quantity in conjunction with change in the opening/closing timing of the intake valve 5a and the exhaust valve 5b at the time of burning mode change: a method in which in transition for burning mode change, a period during which the valve opening period (or the lift amount) of the intake valve 5a is reduced and corrected is provided. This reduces fluctuation in engine torque Te and engine rotational speed Ne caused by fluctuation in air quantity during transition for burning mode change and makes it possible to suppress degradation in running performance.

Embodiment 2

Description will be given to an embodiment 2 of burning mode change control with reference to FIGS. 22A to 22H and FIG. 23.

The engine, system configuration, and the like to which the embodiment 2 is applied are basically the same as illustrated in FIG. 1, FIG. 2, and FIG. 3. Therefore, the duplicated description thereof will be omitted and hereafter, description will be given with a focus on a difference from the embodiment 1.

In the embodiment 2, the changing correction amount outputted from the burning mode change correcting means 28 illustrated in FIG. 3 is different from that in the embodiment 1. This will be described below.

First, description will be given to the control of change from spark ignition burning node to homogeneous charge compression ignition burning mode with reference to the time diagram in FIGS. 22A to 22H.

In the embodiment 1 illustrated in FIGS. 13A to 13H, the following measure is taken when the burning mode is changed from spark ignition burning mode to homogeneous charge compression ignition burning mode: the valve opening period of the intake valve 5a is reduced and corrected on the way in transition from the state corresponding to point A in FIG. 7 to the state corresponding to point D by way of the state corresponding to point B. The state corresponding to point C in FIG. 7 is thereby passed through to reduce engine torque fluctuation and the like.

However, a problem may still remain only with the change control in the embodiment 1. In transition from the state corresponding to point B to point C in FIG. 7, the opening/closing timing of the intake valve 5a and the exhaust valve 5b is largely varied and thus the air quantity may temporarily become larger than a desired value.

To solve this problem, in the embodiment 2, the following measure is taken in change from spark ignition burning mode to homogeneous charge compression ignition burning mode: in transition from the state corresponding to point B to point C, the valve opening period of the intake valve 5a is reduced and corrected to suppress degradation in running performance at the time of burning mode change.

The vertical axes in FIGS. 22A to 22H are the same as the vertical axes in FIGS. 13A to 13H. The solid lines in FIGS. 22A to 22H indicate a manipulated variable and the like in the embodiment 2 and the broken lines in FIGS. 22A to 22H indicate a manipulated variable and the like in the embodiment 1 illustrated in FIGS. 13A to 13H.

In FIG. 22C, the flag Fho is set to ON (=1) in conjunction with change in burning mode change flag Fex and flag Fex2 during the period from time tf=time te+To (or te+Ts) to time tg=time te+To+Tm (or te+Ts+Tm).

With respect to the valve opening period IVevent of the intake valve indicated by FIG. 22G, the following processing is carried out: during the period from time tf to time tg, the valve opening period IVevent of the intake valve that implements the state corresponding to point C in FIG. 7 is reduced and corrected according to the above-mentioned change in flag Fho. During the period from time tg to time th, it is set to the valve opening period of the intake valve that implements the state corresponding to point C in FIG. 7. After time th, it is set to a value that implements the state corresponding to point D.

As the result of this operation, the combustion transitions from one state to another corresponding to point A, B, C, or D in FIG. 7 and the following is implemented on the way in burning mode change from spark ignition burning mode to homogeneous charge compression ignition burning mode: in transition from the state corresponding to point B to the state corresponding to point C, temporary increase in air quantity in conjunction with variation in the opening/closing timing of the intake valve 5a and the exhaust valve 5b is suppressed. As a result, fluctuation in engine torque can be suppressed in transition for mode change.

Description will be given to the control of change from homogeneous charge compression ignition burning mode to spark ignition burning mode with reference to the time diagram in FIGS. 23A to 23H.

In the embodiment 1 illustrated in FIGS. 15A to 15H, the following measure is taken when the burning mode is changed from homogeneous charge compression ignition burning mode to spark ignition burning mode: the valve opening period of the intake valve 5a is reduced and corrected on the way in transition from the state corresponding to point D in FIG. 7 to the state corresponding to point A by way of the state corresponding to point B. The vicinity of point C in FIG. 7 is thereby passed through to reduce engine torque fluctuation.

Also in this case, however, a problem may still remain only with the change control in the embodiment 1. In transition from the state corresponding to point C in FIG. 7 to the state corresponding to point B, the opening/closing timing of the intake valve 5a and the exhaust valve 5b is largely varied and thus the air quantity may be temporarily increased.

To solve this problem, in the embodiment 2, the following measure is taken in change from homogeneous charge compression ignition burning mode to spark ignition burning mode: in transition from the state corresponding to point C to the state corresponding to point B, the valve opening period of the intake valve 5a is reduced and corrected to suppress degradation in running performance at the time of burning mode change.

The vertical axes in FIGS. 23A to 23H are the same as the vertical axes in FIGS. 15A to 15H. The solid lines in FIGS. 23A to 23H indicate a manipulated variable and the like in the embodiment 2 and the broken lines in FIGS. 23A to 23H indicate a manipulated variable and the like in the embodiment 1 illustrated in FIGS. 15A to 15H.

In FIG. 23B, the setting of the burning mode change flag Fex is changed from ON (=1) to OFF (=0) at time te. Then the setting of the flag Fex2 is changed from ON (=1) to OFF (=0) at time tf=time te+To (or te+Ts).

As indicated by FIG. 23C, the following processing is carried out in conjunction with change in Fex2 at time tf: during the period from time tf to time tg=time te+To+Tm (or te+Ts+Tm), the valve opening period for spark ignition burning mode that implements the state corresponding to point B in FIG. 7 is reduced and corrected. During the period from time tg to time th, it is set to the intake valve opening period that implements the state corresponding to point B. After time th, it is changed to a set value that implements the state corresponding to point A.

As the result of this operation, the combustion transitions from one state to another corresponding to point D, C, B, or A in FIG. 7 and the following is implemented on the way in burning mode change from homogeneous charge compression ignition burning mode to spark ignition burning mode: in transition from the state corresponding to point C to the state corresponding to point B, temporary increase in air quantity in conjunction with variation in the opening/closing timing of the intake valve and the exhaust valve is suppressed. As a result, fluctuation in engine torque can be suppressed during a period of mode change.

According to this embodiment, as described up to this point, the valve opening period (or the lift amount) of the intake valve is reduced and corrected on the way in burning mode change. This makes it possible to suppress degradation in running performance at the time of burning mode change.

Embodiment 3

Description will be given to an embodiment 3 of burning mode change control with reference to FIG. 24 to FIGS. 26A to 26H.

The engine, system configuration, and the like to which the embodiment 3 is applied are basically the same as illustrated in FIG. 1, FIG. 2, and FIG. 3. Therefore, the duplicated description thereof will be omitted and hereafter, description will be given with a focus on a difference from the embodiments 1 and 2.

Figure 24:
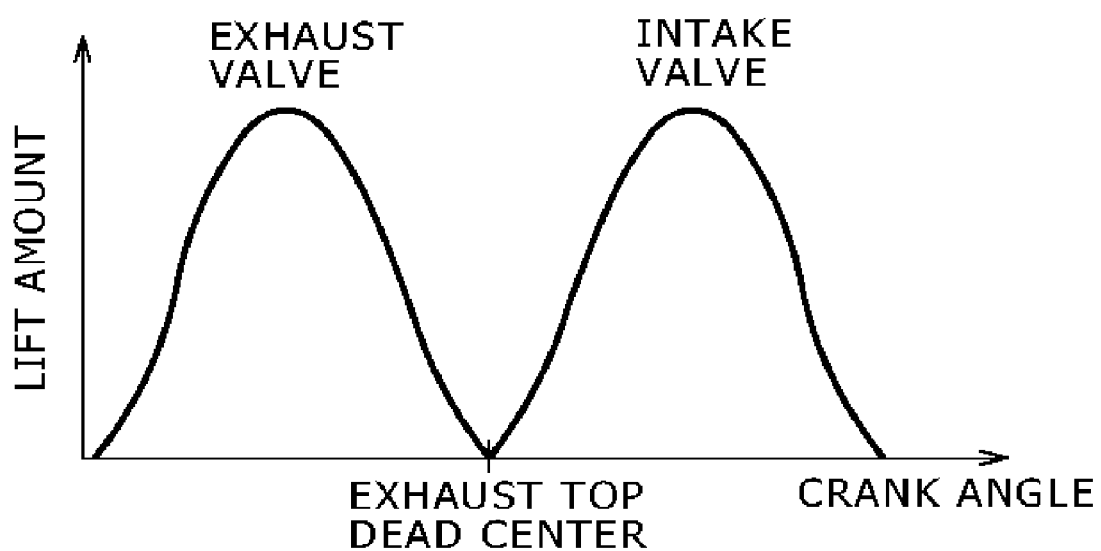
FIG. 24 is a drawing illustrating an operating profile of an intake valve and an exhaust valve in normal throttle spark ignition burning mode in the embodiment 3.

In the embodiment 3, the adjustment of intake air quantity in spark ignition burning mode is carried out by the opening of the throttle valve 2 (normal throttle spark ignition burning mode). In this regard, the embodiment 3 is different from the embodiments 1 and 2 (non-throttle spark ignition burning mode), in which the intake air quantity is adjusted by controlling the valve opening period of the intake valve 5a. In the embodiment 3, therefore, the following measure is taken with respect to the operating profile of the intake valve 5a and the exhaust valve 5b: the lift amount and the valve opening period are made larger than in the embodiments 1 and 2 as illustrated in FIG. 24. However, the intake valve 5a and the exhaust valve 5b are restricted in change in their valve opening period and lift amount. Specifically, the lift amount is continuously reduced with continuous decrease in valve opening period.

First, description will be given to the control of change from normal throttle spark ignition burning mode to homogeneous charge compression ignition burning mode with reference to FIGS. 25A to 25H.

As in the embodiment 2 illustrated in FIGS. 22A to 22H, the opening/closing timing of the intake valve 5a and the exhaust valve 5b is largely varied in transition from the state corresponding to point B in FIG. 7 to the state corresponding to point C. Therefore, the air quantity may be temporarily increased. To suppress this, in the embodiment 3, the valve opening period of the intake valve 5a is reduced and corrected to suppress degradation in running performance at the time of burning mode change.

The time diagram in FIGS. 25A to 25H corresponds to the time diagram in FIGS. 22A to 22H illustrating the embodiment 2 and the vertical axes in FIGS. 25A to 25H are the same as the vertical axes in FIGS. 22A to 22H. The solid lines in FIGS. 25A to 25H indicate a manipulated variable and the like in the embodiment 3 and the broken lines in FIGS. 25A to 25H indicate a manipulated variable and the like in the embodiment 2 illustrated in FIGS. 22A to 22H.

As indicated by FIG. 25D, the throttle opening θTH is kept small till time ti to achieve the state corresponding to point A in FIG. 7. During the period from time ti to time tj=time ti+To (or ti+Ts), the following measure is taken to achieve the state corresponding to point B: the air quantity is kept substantially constant and the internal EGR rate is increased to slightly increase the throttle opening θTH. During the period from time tj to time tl, thereafter, the throttle opening θTH is increased to achieve the state corresponding to point C and after time tl, the throttle valve is substantially fully opened.

As indicated by FIG. 25G, the following measure is taken with respect to the valve opening period IVevent of the intake valve. During the period from time ti to time tj, the valve opening period IVevent is shortened to achieve the state corresponding to point B in FIG. 7. During the period from time tj to time tk=time ti+To+Tm (or ti+Ts+Tm), the flag Fho is set to ON (=1). Therefore, correction by reduction is carried out with respect to a set value for homogeneous charge compression ignition burning mode after time tl. After time tl, the valve opening period IVevent of the intake valve is set to a valve opening period that implements the state corresponding to point D in FIG. 7.

As the result of this operation, the following can be implemented also when the burning mode is changed from normal throttle spark ignition burning mode to homogeneous charge compression ignition burning mode: on the way in transition from the state corresponding to point A in FIG. 7 to the state corresponding to point D, the following can be implemented: it is possible to suppress temporary increase in air quantity in conjunction with variation in the opening/closing timing of the intake valve 5a and the exhaust valve 5b involved in transition from the state corresponding to point B to the state corresponding to point C. As a result, it is possible to suppress fluctuation in engine torque during a period of mode change.

Description will be given to the control of change from homogeneous charge compression ignition burning mode to spark ignition burning mode with reference to FIGS. 26A to 26H.

As in the embodiment 2 illustrated in FIGS. 23A to 23H, the opening/closing timing of the intake valve 5a and the exhaust valve 5b is largely varied in transition from the condition corresponding to point C in FIG. 7 to the state corresponding to point B. Therefore, the air quantity may be temporarily increased. To suppress this, in the embodiment 3, the valve opening period of the intake valve 5a is reduced and corrected to suppress degradation in running performance at the time of burning mode change.

The time diagram in FIGS. 26A to 26H corresponds to the time diagram in FIGS. 23A to 23H illustrating the embodiment 2 and the vertical axes in FIGS. 26A to 26H are the same as the vertical axes in FIGS. 23A to 23H. The solid lines in FIGS. 26A to 26H indicate a manipulated variable and the like in the embodiment 3 and the broken lines in FIGS. 26A to 26H indicate a manipulated variable and the like in the embodiment 2 illustrated in FIGS. 23A to 23H.

As indicated by FIG. 26D, the throttle opening θTH is kept large till time ti to achieve the state corresponding to point D in FIG. 7. During the period from time ti to time tj=time ti+To (or ti+Ts), the following measure is taken to achieve the combustion state corresponding to point C: the intake air quantity is reduced in homogeneous charge compression ignition burning mode to reduce the throttle opening θTH. During the period from time tj to time tl, thereafter, the throttle opening θTH is further reduced to achieve the state corresponding to point B. After time tl, the throttle opening is set to a throttle opening θTH that implements the state corresponding to point A in FIG. 7.

As indicated by FIG. 26G, the following measure is taken with respect to the valve opening period IVevent of the intake valve. Till time tj, the valve opening period IVevent is maintained. During the period from time tj to time tk, the flag Fho is set to ON (=1) and thus correction by reduction is carried out with respect to a set value for spark ignition burning mode after time tk. During the period from time tk to time tl, the valve opening period IVevent is set to a valve opening period that implements the state corresponding to point B in FIG. 7 and after time tl, it is set to a valve opening period of the intake valve that implements the state corresponding to point A in FIG. 7.

As the result of this operation, the following can be implemented also when the burning mode is changed from homogeneous charge compression ignition burning mode to normal throttle spark ignition burning mode: on the way in transition from the state corresponding to point D in FIG. 7 to the state corresponding to point A, the following can be implemented: it is possible to suppress temporary increase in air quantity in conjunction with variation in the opening/closing timing of the intake valve 5a and the exhaust valve 5b involved in transition from the state corresponding to point C to the state corresponding to point B. As a result, it is possible to suppress fluctuation in engine torque during a period of mode change.

According to this embodiment, as mentioned above, the valve opening period (or the lift amount) of the intake valve 5a is reduced and corrected in transition for burning mode change. Thus it is possible to suppress degradation in running performance at the time of burning mode change.

Up to this point, detailed description has been given to an embodiment of the invention. However, the invention is not limited to the above embodiment and the invention can be variously modified in design without departing from the spirit of the invention described in the claims.

In the above embodiment, the restricting condition lies in the valve opening period and the lift amount of the intake valve 5a. However, the invention is not limited to this and an intake valve and an exhaust valve only the valve opening period of which can be continuously varied regardless of lift amount may be used.

The above embodiment is on the assumption that the operating condition is substantially constant before and after burning mode change. However, the invention is not limited to this and the request engine torque or the engine rotational speed may be changed before and after burning mode change.

For example whether or not change between spark ignition burning mode and homogeneous charge compression ignition burning mode is feasible need not be determined only based on request engine torque and engine rotational speed. It may be determined based on at least one of the output signals of sensors that directly or indirectly detect water temperature, exhaust gas temperature, intake air temperature, or fuel temperature.

When the burning mode is changed between spark ignition burning mode and homogeneous charge compression ignition burning mode, the following can be implemented by applying the invention: it is possible to suppress temporary increase in intake air quantity caused by the opening/closing timing of an intake valve and an exhaust valve being largely varied; and it is possible to suppress degradation in running performance and further achieve smooth burning mode change.

What is claimed is:

1. A controller of an engine comprising a fuel injection valve that directly injects fuel into a combustion chamber partitioned on the upside of a piston; an ignition plug for igniting and combusting the fuel in the combustion chamber; an intake valve and an exhaust valve that can respectively control their lifts and/or their opening periods; and a control unit that controls fuel injection by the fuel injection valve, spark ignition by the ignition plug, the lifts and/or the opening periods of the intake valve and the exhaust valve and others,
wherein the control unit selectively sets a non-throttling spark ignition combustion mode in which an airflow rate flowing into the combustion chamber is adjusted by mainly controlling the lift and/or the opening period of the intake valve and the fuel in the combustion chamber is ignited and combusted by the ignition plug and a compression self ignition combustion mode in which the fuel is combusted utilizing the rise of pressure in the combustion chamber according to the rise of the piston as a combustion mode according to operational status of the engine and is instructed to switch the modes; and
wherein, in switching the non-throttling spark ignition combustion mode and the compression self ignition combustion mode, the lift and/or the opening period of the intake valve are/is made smaller than set valves in the compression self ignition combustion mode.

2. The controller of the engine according to claim 1, wherein the control unit sets a first period in which the lift and/or the opening period of the intake valve are/is made smaller than their set values when the non-throttling spark ignition combustion mode is switched to the compression self ignition combustion mode.

3. The controller of the engine according to claim 2, wherein the control unit sets timing at which the first period is finished as timing at which compression self ignition combustion is started or as slightly earlier timing than the timing.

4. The controller of the engine according to claim 2, wherein the control unit sets timing at which the first period is started as timing at which required engine torque is equal to or below a predetermined value or as later timing.

5. The controller of the engine according to claim 4, wherein the predetermined value of the required engine torque is set as engine torque when at least one of three conditions of the condition that air-fuel ratio is equal to or below a predetermined value, the condition that a maximum value of a rate of the rise of pressure in the combustion chamber is equal to or exceeds a predetermined value and the condition that the cycle-by-cycle variation of combustion is equal to or exceeds a predetermined value is met while operation is performed in the compression self ignition combustion mode and engine torque equal to or exceeding the required engine torque is generated under predetermined engine speed.

6. The controller of the engine according to claim 1, wherein the control unit sets a second period in which the lift and/or the opening period of the intake valve are/is made smaller than their set values when the compression self ignition combustion mode is switched to the non-throttling spark ignition combustion mode.

7. The controller of the engine according to claim 6, wherein the control unit sets timing at which the second period is finished as timing at which spark ignition combustion is started or as slightly earlier timing than the timing.

8. The controller of the engine according to claim 6, wherein the control unit sets timing at which the second period is started as timing at which required engine torque is equal to or exceeds a predetermined value or as later timing.

9. The controller of the engine according to claim 1, wherein the control unit sets each timing at which the first, second, third and fourth periods are started based upon at least one of the temperature and the humidity of air flowing into the combustion chamber, atmospheric pressure, the peripheral information of a vehicle in which the engine is mounted and a signal output from a control device except the controller of the engine mounted in the vehicle.

10. The controller of the engine according to claim 1, wherein the control unit sets the lift and/or the opening period of the intake valve in transition in which the mode is switched based upon at least one of the temperature and the humidity of air flowing into the combustion chamber and atmospheric pressure.

11. The controller of the engine according to claim 1, wherein the control unit learns the lift and/or the opening period of the intake valve in the transition in which the mode is switched every time the combustion mode is switched.

12. A controller of an engine comprising a fuel injection valve that directly injects fuel into a combustion chamber partitioned on the upside of a piston; an ignition plug for igniting and combusting the fuel in the combustion chamber; an intake valve and an exhaust valve that can respectively control their lifts and/or their opening periods; a throttle valve that can control an airflow rate flowing into the combustion chamber; and a control unit that controls fuel injection by the fuel injection valve, spark ignition by the ignition plug, the lifts and/or the opening periods of the intake valve and the exhaust valve, an angle of the throttle valve and others, wherein the control unit selectively sets a normal throttling spark ignition combustion mode in which an airflow rate flowing into the combustion chamber is adjusted by mainly controlling an angle of the throttle valve and the fuel in the combustion chamber is ignited and combusted by the ignition plug and a compression self ignition combustion mode in which an airflow rate flowing into the combustion chamber is adjusted by mainly controlling the lift and/or the opening period of the intake valve in a state in which the throttle valve is fully opened or is opened substantially fully and the fuel is combusted utilizing the rise of pressure in the combustion chamber according to the rise of the piston as a combustion mode according to operational status of the engine and is instructed to switch the modes; and wherein, in switching the normal throttling spark ignition combustion mode and the compression self ignition combustion mode, the lift and/or the opening period of the intake valve are/is made smaller than set valves in the compression self ignition combustion mode.

13. The controller of the engine according to claim 12, wherein the control unit sets a third period in which the lift and/or the opening period of the intake valve are/is made smaller than their set values when the normal throttling spark ignition combustion mode is switched to the compression self ignition combustion mode.

14. The controller of the engine according to claim 13, wherein the control unit sets timing at which the third period is finished as timing at which compression self ignition combustion is started or as slightly earlier timing than the timing.

15. The controller of the engine according to claim 13, wherein the control unit sets timing at which the third period is started as timing at which required engine torque is equal to or below a predetermined value or as later timing.

16. The controller of the engine according to claim 12, wherein the control unit sets a fourth period in which the lift and/or the opening period of the intake valve are/is made smaller than their set values when the compression self ignition combustion mode is switched to the normal throttling spark ignition combustion mode.

17. The controller of the engine according to claim 16, wherein the control unit sets timing at which the fourth period is finished as timing at which spark ignition combustion is started or as slightly earlier timing than the timing.

18. The controller of the engine according to claim 16, wherein the control unit sets timing at which the fourth period is started as timing at which required engine torque is equal to or exceeds a predetermined value or as later timing.

* * * * *